US010628985B2

(12) United States Patent
Mishra et al.

(10) Patent No.: US 10,628,985 B2
(45) Date of Patent: Apr. 21, 2020

(54) AVATAR IMAGE ANIMATION USING TRANSLATION VECTORS

(71) Applicant: Affectiva, Inc., Boston, MA (US)

(72) Inventors: Taniya Mishra, New York, NY (US); George Alexander Reichenbach, Andover, MA (US); Rana el Kaliouby, Milton, MA (US)

(73) Assignee: Affectiva, Inc., Boston, MA (US)

( * ) Notice: Subject to any disclaimer, the term of this patent is extended or adjusted under 35 U.S.C. 154(b) by 0 days.

(21) Appl. No.: 16/206,051

(22) Filed: Nov. 30, 2018

(65) Prior Publication Data
US 2019/0172243 A1   Jun. 6, 2019

Related U.S. Application Data

(60) Provisional application No. 62/593,440, filed on Dec. 1, 2017, provisional application No. 62/593,449, filed on Dec. 1, 2017.

(51) Int. Cl.
*G06T 13/40* (2011.01)
*G06K 9/62* (2006.01)
(Continued)

(52) U.S. Cl.
CPC .......... *G06T 13/40* (2013.01); *G06K 9/00302* (2013.01); *G06K 9/4628* (2013.01);
(Continued)

(58) Field of Classification Search
CPC ...... G06T 13/40; G06K 9/00302; G01L 15/16
See application file for complete search history.

(56) References Cited

U.S. PATENT DOCUMENTS

| 3,034,500 A | 5/1962 | Backster, Jr. |
| 3,548,806 A | 12/1970 | Fisher |

(Continued)

FOREIGN PATENT DOCUMENTS

| JP | 08115367 | 7/1996 |
| KR | 10-2005-0021759 A | 3/2005 |

(Continued)

OTHER PUBLICATIONS

Michel, Philipp, "Real Time Facial Expression Recognition in Video Using Support Vector Machines", 2003, ACM, ICMI '03,pp. 258-264 (Year: 2003).*

(Continued)

*Primary Examiner* — Terrell M Robinson
(74) *Attorney, Agent, or Firm* — Adams Intellex, PLC

(57) ABSTRACT

Techniques are described for image generation for avatar image animation using translation vectors. An avatar image is obtained for representation on a first computing device. An autoencoder is trained, on a second computing device comprising an artificial neural network, to generate synthetic emotive faces. A plurality of translation vectors is identified corresponding to a plurality of emotion metrics, based on the training. A bottleneck layer within the autoencoder is used to identify the plurality of translation vectors. A subset of the plurality of translation vectors is applied to the avatar image, wherein the subset represents an emotion metric input. The emotion metric input is obtained from facial analysis of an individual. An animated avatar image is generated for the first computing device, based on the applying, wherein the animated avatar image is reflective of the emotion metric input and the avatar image includes vocalizations.

23 Claims, 15 Drawing Sheets

(51) Int. Cl.
  *G06K 9/00*    (2006.01)
  *G06K 9/46*    (2006.01)
  *G10L 15/00*   (2013.01)
  *G10L 15/06*   (2013.01)
  *G10L 15/16*   (2006.01)
  *G10L 15/22*   (2006.01)
  *G10L 25/63*   (2013.01)
  *G10L 13/027*  (2013.01)
  *G10L 25/78*   (2013.01)

(52) U.S. Cl.
  CPC ......... *G06K 9/6256* (2013.01); *G06K 9/6262* (2013.01); *G06K 9/6271* (2013.01); *G10L 15/005* (2013.01); *G10L 15/063* (2013.01); *G10L 15/16* (2013.01); *G10L 15/22* (2013.01); *G10L 25/63* (2013.01); *G10L 13/027* (2013.01); *G10L 25/78* (2013.01); *G10L 2015/223* (2013.01)

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |

(56) References Cited

U.S. PATENT DOCUMENTS

| | | |
|---|---|---|
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0184170 A1 | 7/2008 | Periyalwar |
| 2008/0201144 A1 | 8/2008 | Song et al. |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0130717 A1* | 5/2012 | Xu ........................ G06T 13/40 704/258 |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0172910 A1 | 6/2014 | Jung et al. |
| 2014/0362091 A1* | 12/2014 | Bouaziz ................. G06T 13/40 345/473 |
| 2016/0104486 A1 | 4/2016 | Penilla et al. |
| 2016/0343160 A1* | 11/2016 | Blattner ................. G06T 13/40 |
| 2017/0003784 A1 | 1/2017 | Garg et al. |
| 2017/0083755 A1* | 3/2017 | Tang ................. G06K 9/00281 |
| 2017/0206064 A1* | 7/2017 | Breazeal ............. H04N 13/239 |
| 2017/0256086 A1* | 9/2017 | Park ........................ G06T 13/40 |
| 2019/0286884 A1* | 9/2019 | Rhee .................... G06K 9/6271 |
| 2019/0294863 A9* | 9/2019 | Qiu ........................ G06N 3/02 |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

Rana Ayman el Kaliouby, Mind-reading machines: automated inference of complex mental states, Jul. 2005, University of Cambridge, Cambridge, United Kingdom.

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming HE, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG—EBGM." Pattern Recognition Letters 29.10 (2008): 1537-1543.

* cited by examiner

AVATAR IMAGE ANIMATION USING TRANSLATION VECTORS

RELATED APPLICATIONS

This application claims the benefit of U.S. provisional patent applications "Avatar Image Animation Using Translation Vectors" Ser. No. 62/593,440, filed Dec. 1, 2017, and "Speech Analysis for Cross-Language Mental State Identification" Ser. No. 62/593,449, filed Dec. 1, 2017.

Each of the foregoing applications is hereby incorporated by reference in its entirety.

FIELD OF INVENTION

This application relates generally to image generation and more particularly to avatar image animation using translation vectors.

BACKGROUND

People engage with their various personal electronic devices and computers in order to consume many types of online content. In addition, people use their devices and computers to participate in social networks and social media. The online content includes news, sports, politics, educational information, cute puppy videos, and much, much more. The social networks support sharing, discussions, and commentary, among many other social activities. Users of social networks engage these online platforms or "digital soapboxes" to boast about their accomplishments; share photographs of their pets, children, and vacations; rant about politics at the local, national, and global levels; and partake in other popular social activities. The social networks can enable a feeling of connectedness, albeit through a screen, since the networks enable friends, family, and followers to 'keep in touch', even over great geographic distances. While the social networks are not completely sufficient replacements for face-to-face interactions, the online interactions supported by the personal electronic devices are often believed by the users to be quite close. Social networks are very effective at conveying messages that the message authors want to share. The social networks can also collect information from the participants to learn about the participants, to suggest content that might be of interest to the participants, and to track the types of information that are emerging and/or popular on the social networks. This last type of data is used in order to determine the social media content that is "trending". The trending information is used to track political activity, the spread of disease throughout a population, and the latest celebrity gossip, among many other possibilities.

An important element of social media is a representation of a person that an individual or other users of social media will associate with the person. The representation can take the form of a profile picture of the person, or it can be some kind of abstraction of the person's character, such as an avatar. An avatar, chosen by the person, can be a powerful tool in representing a person to himself and/or other persons on social media or other digital platforms. Avatars can range from a simple emoji, such as a smiley face, to an abstraction of a person's profile picture, such as an Instagram™ filter.

SUMMARY

Image generation is used for avatar image animation. The avatar image animation uses translation vectors. An avatar image is obtained for representation on a first computing device. The avatar image can include an emoji, an animated emoji, a cartoon, a video clip, a morphed version of an image of a user, and so on. The computing device can include a laptop and desktop computer; a personal computing device such as a smartphone, a personal digital assistant, a web-enabled e-book reader, and a tablet computer; a wearable computing device such as a smart watch and smart glasses; etc. An autoencoder is trained, on a second computing device comprising an artificial neural network, to generate synthetic emotive faces. An autoencoder can include a feedforward, non-recurrent neural network such as a convolutional neural network, a deep neural network, etc. An autoencoder can include unsupervised learning models. An autoencoder can include multiple layers in the neural network. The second computing device can be a device similar to the first computing device. The second computing device can be a device different from the first computing device, such as a server. A plurality of translation vectors which correspond to a plurality of emotion metrics is identified based on the training. The translation vectors can be used to map an avatar image with one facial expression to an avatar image with a different facial expression. The different expression can include a smile, frown, smirk, laugh, etc. A subset of the plurality of translation vectors is applied to the avatar image, wherein the subset represents an emotion metric input. Based on the emotion metric input, the translation vectors can be applied to map an avatar image with a neutral expression to an avatar image with a different expression. An animated avatar image is generated for the first computing device, based on the applying, wherein the animated avatar image is reflective of the emotion metric input.

The emotion metric input can be obtained from facial analysis of an individual. The facial analysis can be based on using classifiers, using a deep neural network, and so on. The animated avatar can represent facial expressions of the individual. The animated emoji, cartoon, morphed imaged, etc. can represent a smile, a smirk, a frown, a laugh, a yawn, etc. The facial expression can be identified using a software development kit (SDK). The software development kit can be provided by a vendor, obtained as shareware, and so on. The animated avatar can represent an empathetic mirroring of the individual. In embodiments, the empathetic mirroring can cause the avatar to have a similar expression to the individual. The similar expression can include a smile in reaction to a smile, a smirk in reaction to a smirk, and so on. In other embodiments, the empathetic mirroring can cause the avatar to have a complementary expression to the individual. The complementary expression can include a sad expression in reaction to crying, a thinking expression in response to anger, etc.

Various features, aspects, and advantages of numerous embodiments will become more apparent from the following description.

BRIEF DESCRIPTION OF THE DRAWINGS

The following detailed description of certain embodiments may be understood by reference to the following figures wherein.

DETAILED DESCRIPTION

Figure 1:
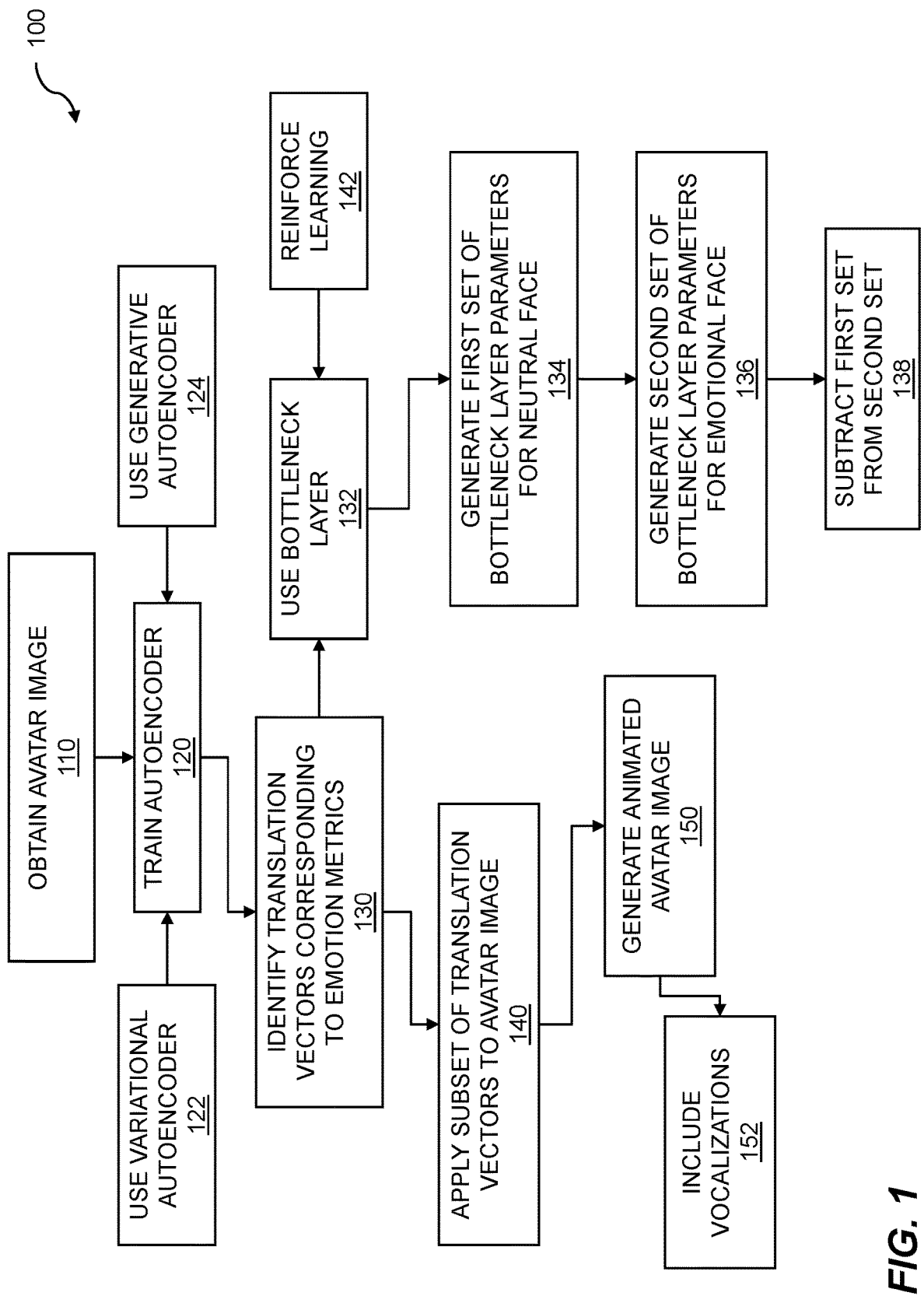
FIG. 1 is a flow diagram for an emotion-enabled animation.

Individuals can interact with friends, family, followers, like-minded people, and others, using a variety of social networking platforms. The social networking platforms are readily accessible using any of a constellation of electronic devices such as smartphones, personal digital assistants, tablets, laptops, and so on. The devices enable the users to share content and to view and interact with websites and the contents of the websites such as streaming media, social media, newsfeeds, information channels, and numerous other channels. Viewing and interacting with various channels can induce emotions, moods, and mental states in the individuals. The channels can inform, amuse, entertain, annoy, anger, bore, etc., those who view the channels. As a result, the emotion or emotions of a given individual can be directly impacted by interacting with the shared channels. The emotion or emotions of the given individual can be shared and displayed by friends, followers, and those whom they follow, etc. The sharing of an emotion can be realized using an avatar image animation. The emotion that is displayed using the animated avatar can represent an empathetic mirroring of the individual. That is, the avatar can have an expression similar to that of the individual, and the avatar can have an expression complementary to that of the individual. For a similar expression, the avatar can display a smile while the user is smiling, a frown when the user is frowning, etc. For a complementary expression, the avatar can display a sad face with the individual is crying, a thoughtful face when the individual is angry, and so on.

The use of the social networks has become widespread among many types of users. The social networks enable written exchanges, sharing of photos and videos, and support of audio and video interactions. While the social networks are not completely sufficient replacements for face-to-face interactions, the online interactions supported by the personal electronic devices are often believed to be quite close and intimate. Social networks are very effective at conveying messages that the message authors want to share. Yet, as those familiar communication formats such as text, audio, and video chat, teleconferences, and videoconferences will confirm, not all information exchanged between participants is verbal or visual. The principal reason for a face-to-face interaction is to be able to observe nonverbal information such as body language, eye contact, facial expression, non-verbal vocalizations, and so on. These additional communication modes can greatly influence emotions of all members in an exchange. Various emotional metrics of an individual can be determined by applying a subset of a plurality of translation vectors to an avatar image. The translation metrics can be determined from the interaction of an individual with a social network site or other site. The translation vectors can be identified based on training an autoencoder, where the autoencoder can be based on an artificial neural network. The artificial neural network can include a convolutional neural network, a deep neural network, and so on.

In disclosed techniques, image generation is used for avatar image animation. The avatar image animation uses translation vectors. An avatar image is obtained for representation on a first computing device. An autoencoder is trained, on a second computing device comprising an artificial neural network, to generate synthetic emotive faces. A plurality of translation vectors corresponding to a plurality of emotion metrics and based on the training is identified. A subset of the plurality of translation vectors is applied to the avatar image, wherein the subset represents an emotion metric input. An animated avatar image is generated for the first computing device, based on the applying, wherein the animated avatar image is reflective of the emotion metric input.

The animated avatar image can represent a mirroring of emotions. For example, in response to a person smiling, the animated avatar image can smile back. In response to a person laughing, the animated avatar image can laugh back, which includes both visual and vocal animation. The mirroring can take the form of empathetic mirroring or complementary mirroring, in which the animated avatar image response can include an animation to show empathy for or complement a person's emotion. For example, a sad face with red eyes analyzed from an image of a person can result in the animated avatar image shedding tears in empathy. Likewise a sad face with a description of being offended by someone can result in the animated avatar image shaking its head in empathetic disbelief Mirroring can include mirrored vocal responses and mirroring of a person's gestures, as well. It should be understood that emotions in this context can be a proxy for what are normally considered emotions, such as happiness or sadness, as well as other forms of personal and mental condition such as mental states, cognitive states, and so on. For example, a mental state may include concentration, and a cognitive state may include distractedness. In some contexts, mental state or cognitive state may be the proxy term of preference. Thus in some embodiments, the avatar image includes vocal mirroring. And in other embodiments, the avatar image includes complementary emotions. And in yet other embodiments, the avatar image includes empathetic mirroring.

The animated avatar image can be altered after it is first generated. For example, a person may be sad for a long time, and an avatar may be generated based on facial images of the person while a sad face is exhibited. At a later time, one or more additional facial images of the person may be obtained, and the avatar image can be modified, altered, or changed based on the subsequent one or more additional facial images. For example, a later, deep smile for the person may generate a mirrored smiling avatar image that replaces or animates from the first generated avatar image. The person may use a self-avatar which is generated according to the current invention. Thus some embodiments comprise altering a self-avatar image of a person based on facial analysis of images of the person obtained after the self-avatar image was generated.

FIG. 1 is a flow diagram for an emotion-enabled animation. Various disclosed techniques include image generation for avatar image animation using translation vectors. The flow 100 includes obtaining an avatar image 110 for representation on a first computing device. The avatar image can be based on one or more images of a person, a morphed image, and the like. The avatar image can be based on an emoji, an animated emoji, a cartoon, and so on. In embodiments, the avatar image can include a humanoid face. The humanoid face can be a simulated face, a cartoon face, a character face, and so on. In embodiments, the avatar image includes vocalizations. The vocalization can include speech vocalizations, non-speech vocalizations, etc. The first computing device can include a personal electronic device such as a smartphone, a personal digital assistant (PDA), and a tablet computer. The first computing device can include a wearable device such as a smart watch, smart glasses, a smart garment, etc. The first computing device can be a laptop computer, a desktop computer, etc. The flow 100 incudes training an autoencoder 120, on a second computing device comprising an artificial neural network, to generate synthetic emotive faces. The artificial neural network can include a convolutional neural network, a deep neural network, and so on. The second computing device can be similar to the first computing device or can be different from the first computing device. The second computing device can be a local server, a remote server, a blade server, a distributed server, a cloud server, and so on. Various types of autoencoders can be used. In embodiments, the training the autoencoder can include using a variational autoencoder 122. In other embodiments, the training the autoencoder can include using a generative autoencoder 124. In embodiments, the training is based on a plurality of facial videos of pre-catalogued facial emotion expressions.

The flow 100 includes identifying a plurality of translation vectors corresponding to a plurality of emotion metrics 130, based on the training. The translation vectors can be used to translate an avatar image, including a humanoid face, from one expression of an emotion to another expression of the same emotion or to a different emotion. The translation vectors can correspond to emotion metrics, where the emotion metrics can be used to determine one or more emotions, an intensity of an emotion, a duration of an emotion, and so on. The emotions can include happy, sad, angry, bored, and so on. In embodiments, the emotion metric input is obtained from facial analysis of an individual. The facial analysis can be based on one or more images captured from the individual. In embodiments, the facial expression is identified using a software development kit (SDK). The software development kit can be obtained from the provider of the animated avatar, from a third party, from shareware, and so on. In embodiments, the identifying the plurality of translation vectors uses a bottleneck layer 132 within the autoencoder. The bottleneck layer can include a fewer number of nodes than the one or more preceding hidden layers in an artificial neural network. The bottleneck layer can create a constriction in the artificial neural network. The bottleneck layer can force information that is pertinent to a classification, for example, into a low dimensional representation. The flow 100 can further include generating a first set of bottleneck layer parameters, from the bottleneck layer, learned for a neutral face 134. The first set of bottleneck layer parameters can be used to identify characteristics of the neutral face. The characteristics of the neutral face can include lip position, eyelid position, and so on. The neutral face can be the humanoid face, a cartoon face, and so on. The flow 100 further includes generating a second set of bottleneck layer parameters for an emotional face 136. The second set of bottleneck layer parameters can be used for determining the one or more emotions of the emotional face. The second set of bottleneck layer parameters can be used to identify emotions based on non-speech vocalizations such as laughter, cries, sighs, squeals, yawns, grunts, clicks, filled pauses, unfilled pauses, and so on. The flow 100 further includes subtracting the first set of bottleneck layer parameters from the second set of bottleneck layer parameters 138 for use in the translation vectors. The subtracting the first set of bottleneck layer parameters from the second set of bottleneck layer parameters can be used to map the transition from the face with the neutral expression to the face with the emotional expression. The mapping can include intermediate steps between the neutral face and the emotional face so that the avatar animation can show the onset of the emotional face, variations of the emotional face such as head movement and blinking eyes, the decay of the emotional face, and so on.

The flow 100 includes applying a subset of the plurality of translation vectors to the avatar image 140, wherein the subset represents an emotion metric input. Many translation vectors can be identified in order to translate a neutral avatar face such as a humanoid face to an emotional avatar face. The emotional face can be derived from the neutral face by using a subset of the translation vectors. A happy face can result from using a subset of the translation vectors, a laughing face can result from using a subset of the translation vectors, and so on. The subsets of translation vectors may overlap or may not overlap, depending on the desired emotional face. The flow 100 includes reinforcing learning 142 of one or more bottleneck layers. Feedback can be provided, either manually or automatically, to further train a bottleneck layer based on responses from a person to a currently displayed avatar image.

The flow 100 includes generating an animated avatar image 150 for the first computing device, based on the applying, wherein the animated avatar image is reflective of the emotion metric input. The generated animated avatar image can be rendered on a screen coupled to the first computing device. The generated animated avatar image can be rendered in a program, an app, a webpage displayed in a web browser, and so on. The animated avatar can represent facial expressions of an individual. The individual can be the user of the first computing device. In embodiments, the avatar image includes body language. The body language can include body position, body orientation, body movement, and so on. In embodiments, the generating further includes vocalizations 152 based on the emotion metric input. The vocalizations can include speech vocalizations, non-speech vocalizations, etc. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
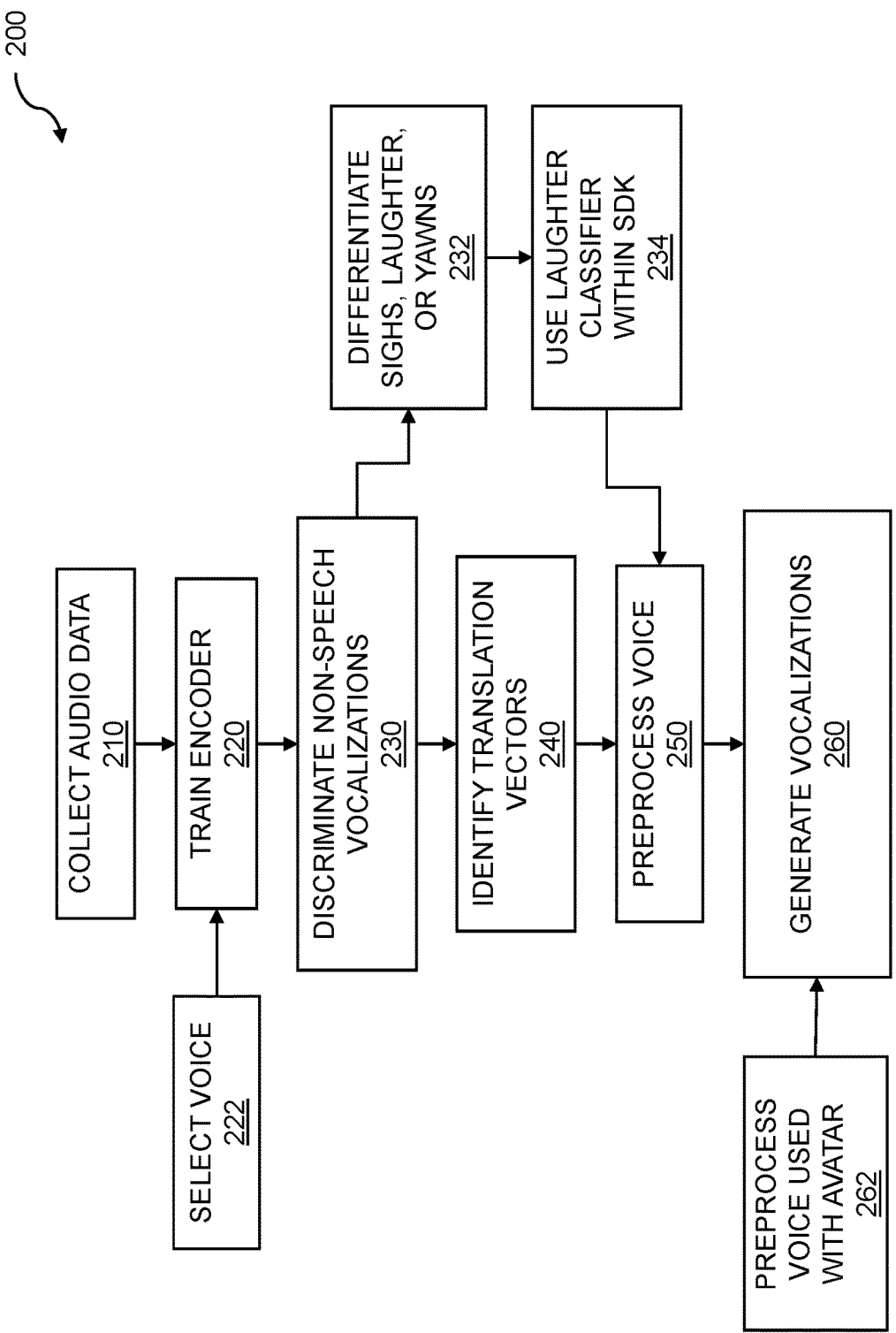
FIG. 2 is a flow diagram for generating vocalizations.

FIG. 2 is a flow diagram for generating vocalizations. Image generation is performed for avatar image animation using translation vectors. The flow 200 includes collecting audio data 210. The audio data can be collected using a microphone, audio transducer, or other audio capture apparatus coupled to a first computing device. In embodiments, the audio capture apparatus, such as a microphone, can be positioned so that it can be used to capture speech, non-speech vocalization, other vocalizations, etc. The flow 200 includes training an autoencoder 220, on a second computing device comprising an artificial neural network, to generate synthetic emotive voices. The autoencoder can include a variational autoencoder, a generational autoencoder, etc.

The computing device can be a device similar to the first computing device, a local server, a remote server, a cloud server, a distributed computing device, and so on. The artificial neural network can include a convolutional neural network, a deep neural network, and the like. The generated synthetic emotive voice can be based on a selected voice 222. The selected voice can include a neutral voice. The synthetic emotive voice can be selected based on gender, race, age, user preference, and so on. The selected voice can be based on selection of an avatar, where the avatar image includes vocalizations. In embodiments, the avatar includes non-speech vocalizations.

The flow 200 includes discriminating non-speech vocalizations 230 from speech vocalizations within the collected audio data. The collected audio data can include vocalization, where the vocalizations can include non-speech vocalizations. The non-speech vocalization can include grunts, whistles, clicks, groans, and so on. In embodiments, the non-speech vocalizations include sighs, laughter, or yawns. The discriminating non-speech vocalizations include differentiating sighs, laughter, or yawns 232 from the other non-speech vocalizations within the captured audio data. The non-speech vocalizations can be differentiated using an algorithm, a heuristic, a code segment, a code library, and so on. In embodiments, laughter can be identified in the non-speech vocalizations using a laughter classifier within a software development kit SDK 234. The software development kit can be supplied by the provider of a social network platform, by a third party, through shareware, etc. In embodiments the non-speech vocalizations can include laughter, cries, sighs, squeals, yawns, grunts, filled pauses, and unfilled pauses.

The flow 200 includes identifying a plurality of translation vectors 240 corresponding to a plurality of emotion metrics, based on the training. The translation vectors can translate the neutral voice to another voice based on one or more emotion metrics. The other voice can include a happy voice, a contented voice, a bored voice, a whining voice, an angry voice, and so on. The translation vectors can include translating the neutral voice or a non-speech vocalization to another non-speech vocalization. The flow 200 includes preprocessing the selected voice 250. The selected voice can be preprocessed to produce other voices based on the emotion metrics. The selected voice can be preprocessed to produce non-speech vocalizations based on the emotion metrics. The flow 200 includes generating vocalizations 260 based on the emotion metric input. The generating vocalizations can include generating speech vocalizations, non-speech vocalizations, and so on. In embodiments, the vocalizations are based on preprocessing a voice used with the animated avatar 262. The preprocessing the voice used with the animated avatar can include matching the voice to demographic or other characteristics such as age, gender, preferred accent, speech rate, and so on. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
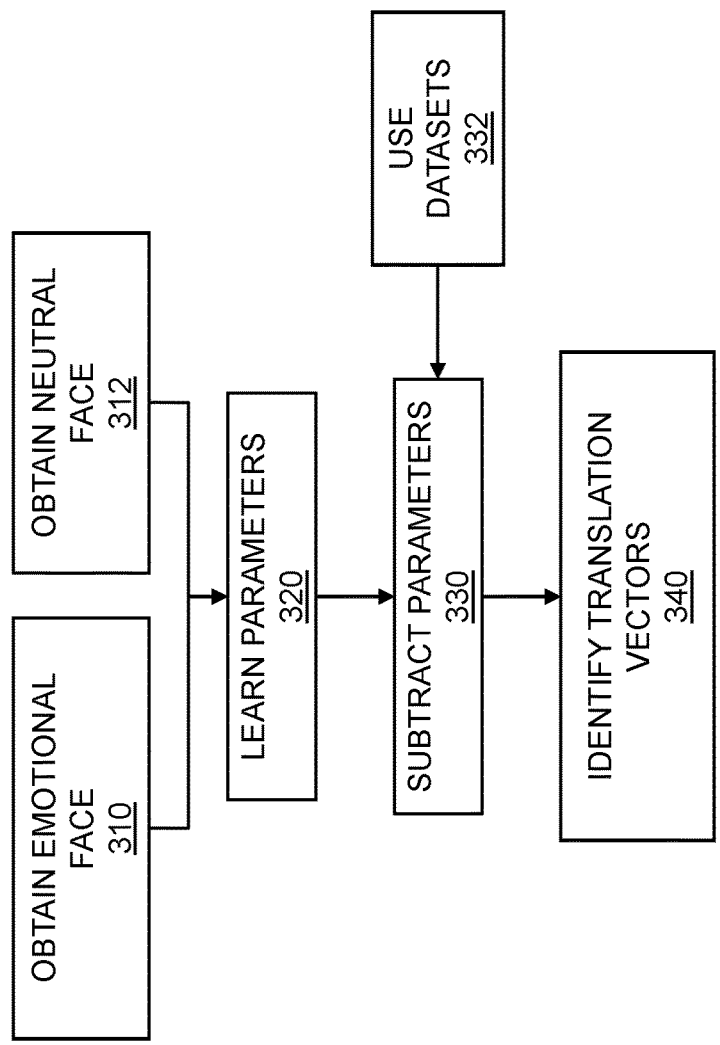
FIG. 3 is a flow diagram for identifying translation vectors.

FIG. 3 is a flow diagram for identifying translation vectors. Data including image data and audio data can be collected from a person interacting with a computing device. The data that is collected can be used for image generation for avatar image animation using translation vectors. The plurality of translation vectors can be identified using a bottleneck layer within an autoencoder such as a variational autoencoder and a generative autoencoder. The flow 300 incudes obtaining an emotional face 310. The emotional face can be obtained using a computing device with which a person is interacting, a webcam, and so on. The emotional face can be an avatar image that represents a given emotion. The emotion can be based on a facial expression such as a smile, frown, yawn, smirk, laugh, and so on. The flow 300 includes obtaining a neutral face 312. The neutral face can be obtained using the computing device, the webcam, etc. The flow 300 includes learning parameters 320. The parameters can be related to a layer within a convolutional neural network, a deep neural network, and so on. The learning can include generating parameters for the layers of the convolutional neural network. In embodiments, the generating includes generating a first set of bottleneck layer parameters, from the bottleneck layer, learned for a neutral face. The parameters can be used for identifying the neutral face in collected video data. In other embodiments, the generating includes generating a second set of bottleneck layer parameters for an emotional face.

The flow 300 further includes subtracting the first set of bottleneck layer parameters from the second set of bottleneck layer parameters 330 for use in the translation vectors. The subtracting includes subtracting the neutral face parameters from the emotional face parameters. The subtracting can be based on using datasets 332. The datasets can include video data and audio data of a person displaying neutral faces and emotional faces. The flow 300 includes identifying translation vectors 340. The translation vectors can correspond to a plurality of emotion metrics, where the emotion metrics can be based on training of a convolutional neural network. The emotion metrics can include emotion intensity, emotion onset time, duration, decay, etc. The translation vectors can be used to map a neutral avatar or face bot to a smile, frown, yawn, smirk, laugh, and so on.

Machine learning for generating parameters, analyzing data such as facial data and audio data, and so on, can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy; whether a voice is female, male, or robotic; whether a message is legitimate email or a "spam" message; and so on. The data can include unstructured data and can be of a large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take certain actions in an environment. The actions that are taken by the agents should maximize a goal such as a "cumulative reward." A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and suboptimal actions are not explicitly corrected. Rather, on-line or computational performance is the focus. On-line performance includes finding a balance between exploration of new (uncharted) territory or spaces, and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, etc., of an individual, then a positive mood, emotion, or mental state can be used to adjust the model and algorithm. Positive outcomes can include a person being more engaged, where engagement is based on affect, the person spending more time playing an online game or navigating a webpage, the person converting by buying a product or service, and so on. The reinforced learning can be based on exploring a solution space and adapting the model, algorithm, etc., based on outcomes of the exploration. When positive outcomes are encountered, the positive outcomes can be reinforced by changing weighting values within the model or algorithm. Positive outcomes may result in increasing weighting values. Negative outcomes, where weighting values may be reduced or otherwise adjusted, can also be considered. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors.

Figure 4:
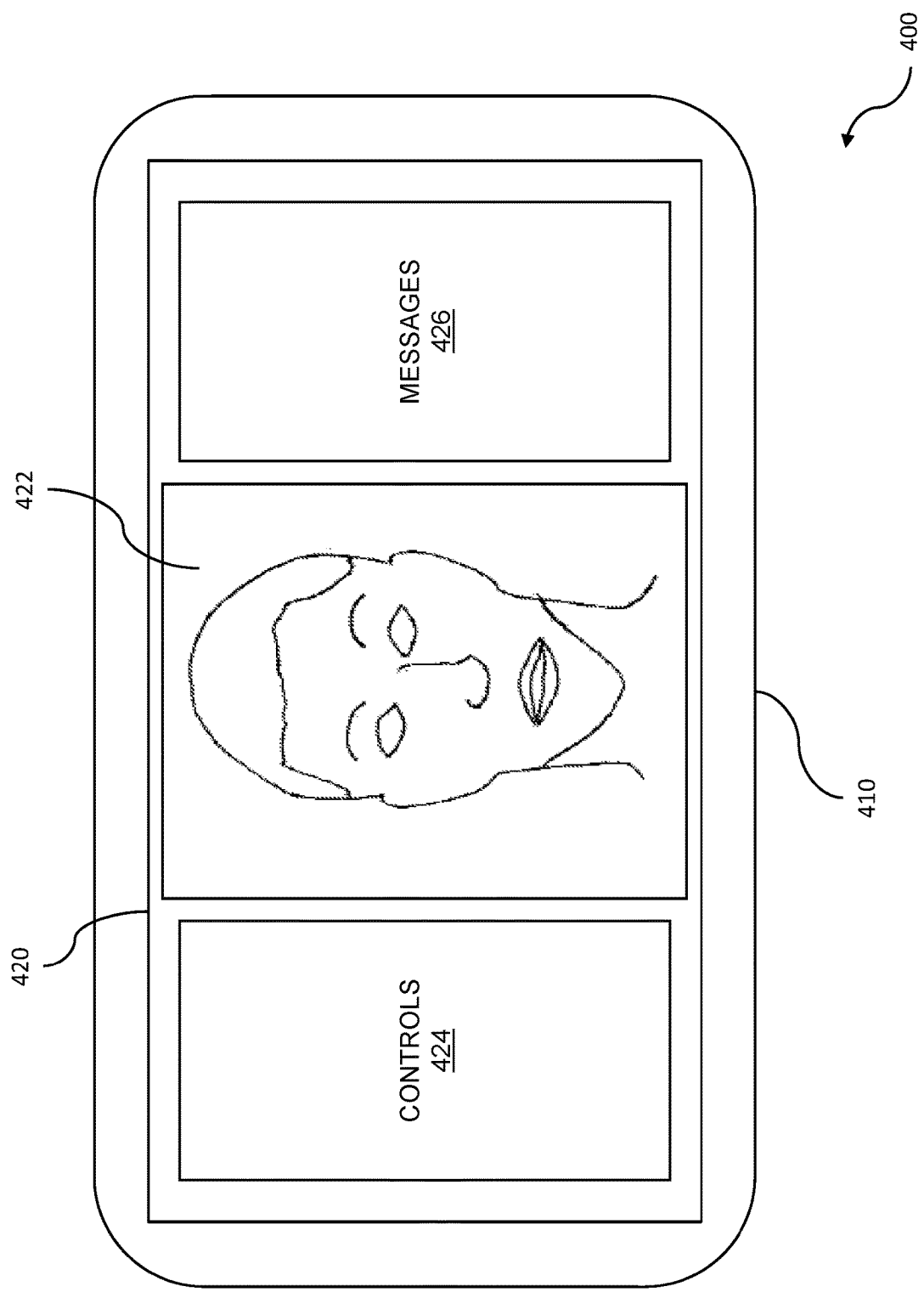
FIG. 4 illustrates an empathy avatar.

FIG. 4 illustrates an empathy avatar. An empathy avatar can represent an empathetic mirroring of an individual. The empathy avatar or bot can include an avatar image animation using translation vectors. The plurality of translation vectors can be identified using a bottleneck layer within an autoencoder. An empathy avatar 400 can be rendered on a computing device 410. The computing device can include a handheld computing device such as a smartphone, a personal digital assistant (PDA), a tablet computer, a wearable computing device such as a smart watch, smart glasses, and so on. The computing device can include a laptop computer, a desktop computer, etc. A display 420 can be coupled to the computing device. The display can be used for rendering various images and data including an empathy avatar 422. The empathy avatar can be represented by a bot, an animated emoji, a cartoon, an image of a person, and so on. The display can render control information 424. The control information can include buttons, pulldown menus, sliders, and so on, that can be used for controlling that empathy avatar that is displayed. The controls can choose which avatar is displayed, the size of the avatar, the volume of audio included with displaying the empathy avatar, and so on. The display can render messages 426. The messages can include video information, text messages, email, chat, and other information with which a person can interact. The information that can be presented can be based on an emotional state of the person.

Figure 5:
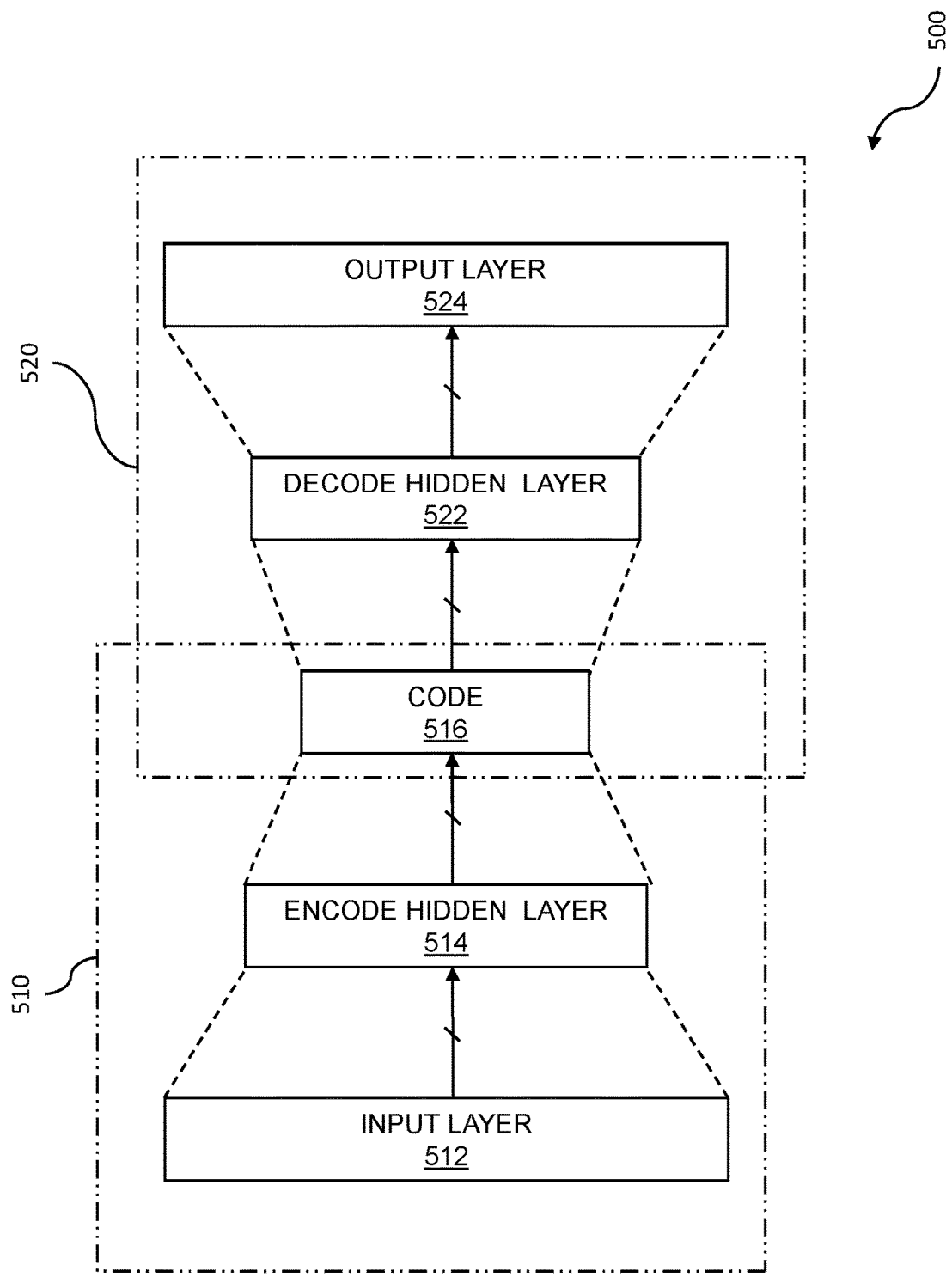
FIG. 5 shows an autoencoder.

FIG. 5 shows an autoencoder. An autoencoder can include a plurality of layers 500 including input layers, hidden layers, a bottleneck layer, output layers, and so on. A plurality of translation vectors can be identified, where the translation vectors can be used to translate a neutral avatar or bot expression to another emotive expression. The bottleneck layer within the autoencoder, such as a variational autoencoder and a generative autoencoder, can be used to generate the translation vectors. Data including audio data and video data can be collected for image generation for avatar image animation using the translation vectors.

An autoencoder can include a feedforward, non-recurrent neural network. Autoencoders can include unsupervised learning models. An autoencoder can include an input layer 512. An input layer can receive image data such as a still image, facial data, emotional data, mental state data, mood data, and so on. The input layer can be coupled to one or more encode hidden layers 514. The one or more hidden encode layers can encode the input data. The encoding can be based on an activation function, a weight, a bias, and so on. The encode hidden layer can generate a code 516. Multiple layers 510 can be included from the input layer to the code layer and various types of layers can be repeated as needed. The code can include latent variables, a latent representation, etc. The code can include a different dimensionality such as a lower dimensionality than the data. The code can be compressed. The code can be decoded using one or more decode hidden layers 522. The decode hidden layer can be used to reconstruct the input data processed by the input layer. The output layer 524 can include the reconstructed input. Multiple layers 520 can be included from the code layer to the output layer, and various types of layers can be repeated to accomplish desired goals.

Figure 6:
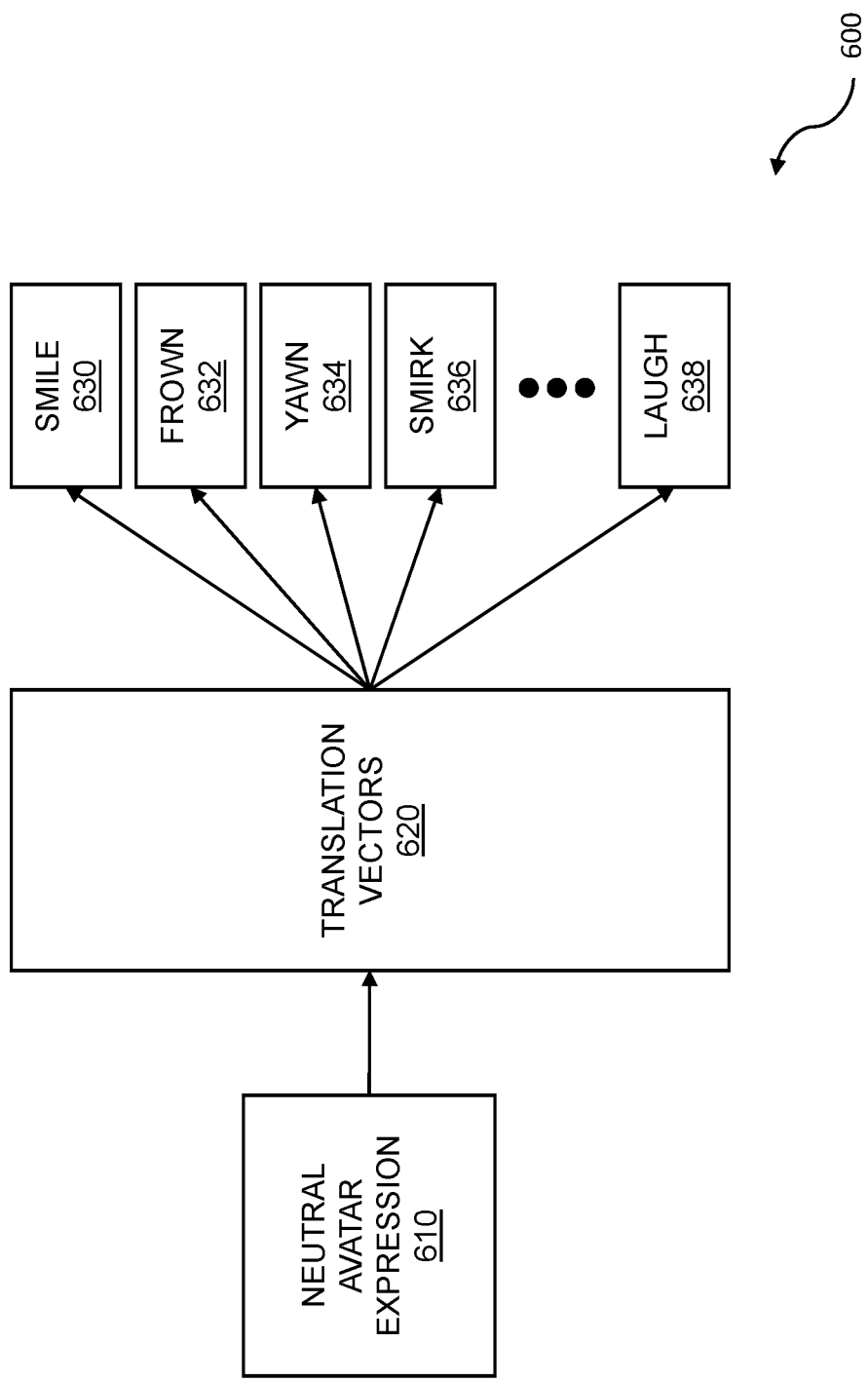
FIG. 6 is an example illustrating translation vectors.

FIG. 6 is an example illustrating translation vectors. Avatar image animation can be based on translation vectors 600. A plurality of translation vectors can be identified using a bottleneck layer within an autoencoder. An autoencoder, such as a variational autoencoder, a generational autoencoder, and so on, can include an artificial neural network. The artificial neural network can include a convolutional neural network, a deep neural network, etc. The autoencoder can be trained to generate a synthetic emotive face, where the synthetic emotive face can be an emoji, a cartoon, an image of a person, a morphed image, and so on. The generating a synthetic emotive face can include generating a neutral avatar face, where the neutral avatar face can display a neutral avatar expression 610. The neutral avatar expression can be learned for a neutral facial expression of a person, for averaged facial expressions for a plurality of people, and so on. The learning can be based on using a convolutional neural network for which layers of the convolutional neural network can be generated. In embodiments, the learning can include generating a first set of bottleneck layer parameters, from the bottleneck layer, learned for a neutral face. The neutral face can be "translated" using translation vectors 620 to show other emotions, where determining the one or more emotions can be based on detecting laughter, cries, sighs, yawns, grunts, filled and unfilled pauses, and so on, from the video data and the audio data. In embodiments, the translating can be based on generating a second set of bottleneck layer parameters for an emotional face. In other embodiments, subtracting the first set of bottleneck layer parameters from the second set of bottleneck layer parameters can be used in the translation vectors.

The avatar or bot, including an animated avatar, may display other empathetic data which is different from the empathetic data of a user. The displaying of empathetic data can be based on the translation vectors. In embodiments, the avatar can be based on "empathetic mirroring". For empathetic mirroring, the avatar might mirror back the same facial expression as seen on the face of a person, while at other times, the avatar might mirror back a different expression. In embodiments, the avatar expression might mirror laughter when the person is laughing, while the avatar might mirror a sad face when the person is crying, or a thinking face when the person is angry. The translation vectors can be used to generate a variety of facial expressions including a smile 630, a frown 632, a yawn 634, a smirk 636, a laugh 638, sadness, thinking, ennui, and so on.

Figure 7:
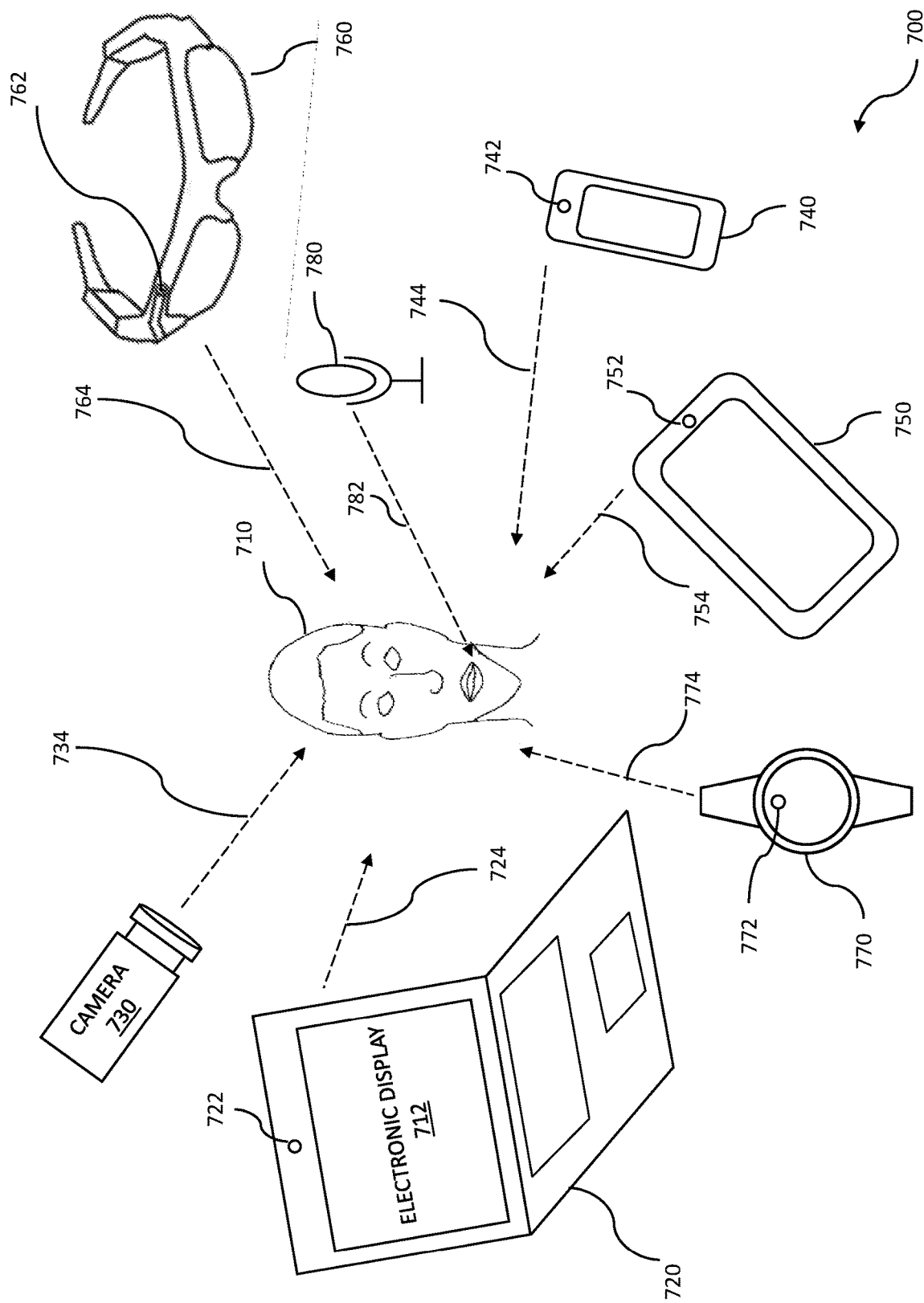
FIG. 7 is a diagram showing image and audio collection including multiple mobile devices.

FIG. 7 is a diagram showing image and audio collection including multiple mobile devices. Data including image data and audio data can be collected using multiple mobile devices, where the data can be used for image generation for avatar image animation using translation vectors. The plurality of translation vectors can be identified using a bottleneck layer within an autoencoder such as a variational autoencoder and a generative autoencoder. In the diagram 700, the multiple mobile devices can be used separately or in combination to collect video data, audio data, or both video data and audio data on a user 710. While one person is shown, the video data and audio data can be collected on multiple people. A user 710 can be observed as she or he is performing a task, experiencing an event, viewing a media presentation, and so on. The user 710 can be shown one or more media presentations, political presentations, social media, or another form of displayed media. The one or more media presentations can be shown to a plurality of people. The media presentations can be displayed on an electronic display 712 or another display. The data collected on the user 710 or on a plurality of users can be in the form of one or more videos, video frames, still images, audio channels, etc. The plurality of video data and audio data can be of people who are experiencing different situations. Some example situations can include the user or plurality of users being exposed to TV programs, movies, video clips, social media, and other such media. The situations could also include exposure to media such as advertisements, political messages, news programs, and so on.

As noted before, video data and audio data can be collected on one or more users in substantially identical or different situations and viewing either a single media presentation or a plurality of presentations. The data collected on the user 710 can be analyzed and viewed for a variety of purposes including expression analysis, mental state analysis, emotional state analysis, and so on. The electronic display 712 can be on a laptop computer 720 as shown, a tablet computer 750, a cell phone 740, a television, a mobile monitor, or any other type of electronic device. In one embodiment, video data including expression data is collected on a mobile device such as a cell phone 740, a tablet computer 750, a laptop computer 720, or a watch 770. Similarly, the audio data including speech data and non-speech vocalizations can be collected on one or more of the mobile devices. Thus, the multiple sources can include at least one mobile device, such as a phone 740 or a tablet 750, or a wearable device such as a watch 770 or glasses 760. A mobile device can include a forward-facing camera and/or a rear-facing camera that can be used to collect expression data. A mobile device can include a microphone, audio transducer, or other audio capture apparatus that can be used to capture the speech and non-speech vocalizations. Sources of expression data can include a webcam 722, a phone camera 742, a tablet camera 752, a wearable camera 762, and a mobile camera 730. A wearable camera can comprise various camera devices, such as a watch camera 772. Sources of audio data 782 can include a microphone 780.

As the user 710 is monitored, the user 710 might move due to the nature of the task, boredom, discomfort, distractions, or for another reason. As the user moves, the camera with a view of the user's face can be changed. Thus, as an example, if the user 710 is looking in a first direction, the line of sight 724 from the webcam 722 is able to observe the user's face, but if the user is looking in a second direction, the line of sight 734 from the mobile camera 730 is able to observe the user's face. Furthermore, in other embodiments, if the user is looking in a third direction, the line of sight 744 from the phone camera 742 is able to observe the user's face, and if the user is looking in a fourth direction, the line of sight 754 from the tablet camera 752 is able to observe the user's face. If the user is looking in a fifth direction, the line of sight 764 from the wearable camera 762, which can be a device such as the glasses 760 shown and can be worn by another user or an observer, is able to observe the user's face. If the user is looking in a sixth direction, the line of sight 774 from the wearable watch-type device 770, with a camera 772 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 710 can also use a wearable device including a camera for gathering contextual information and/or collecting expression data on other users. Because the user 710 can move her or his head, the facial data can be collected intermittently when she or he is looking in a direction of a camera. In some cases, multiple people can be included in the view from one or more cameras, and some embodiments include filtering out faces of one or more other people to determine whether the user 710 is looking toward a camera. All or some of the expression data can be continuously or sporadically available from the various devices and other devices.

The captured video data can include facial expressions, and can be analyzed on a computing device such as the video capture device or on another separate device. The analysis can take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and can be sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 8:
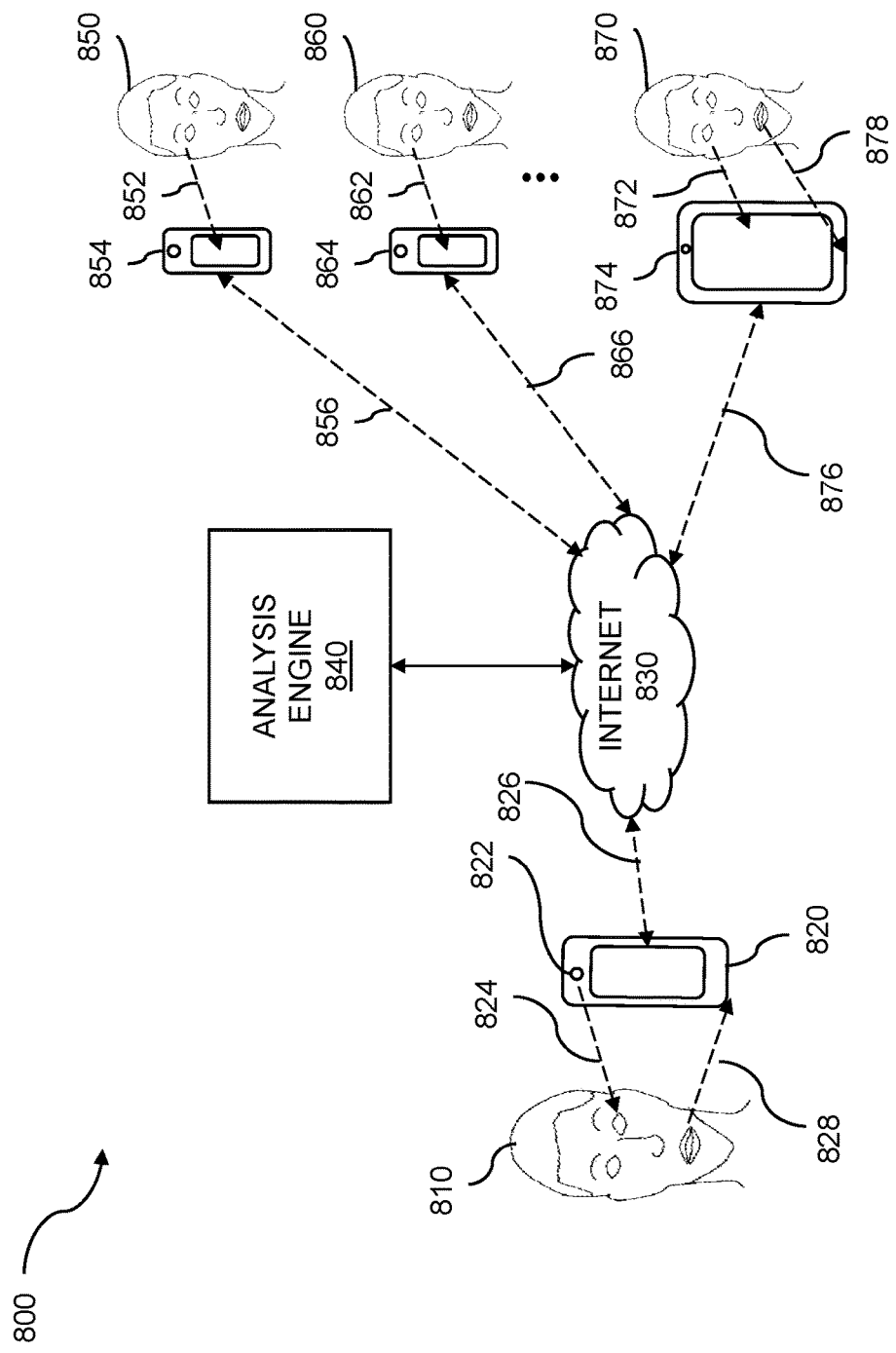
FIG. 8 illustrates live streaming of social video and audio.

FIG. 8 illustrates live streaming of social video and audio. The streaming of social video and social audio can be applied to avatar image animation using translation vectors. The plurality of translation vectors can be identified using a bottleneck layer within an autoencoder. The streaming and analysis can be facilitated by a video capture device, a local server, a remote server, a semiconductor-based logic, and so on. The streaming can be live streaming and can include mental state analysis, mental state event signature analysis, etc. Live streaming video is an example of one-to-many social media, where video can be sent over the Internet from one person to a plurality of people using a social media app and/or platform. Live streaming is one of numerous popular techniques used by people who want to disseminate ideas, send information, provide entertainment, share experiences, and so on. Some of the live streams can be scheduled, such as webcasts, online classes, sporting events, news, computer gaming, or video conferences, while others can be impromptu streams that are broadcast as needed or when desirable. Examples of impromptu live stream videos can range from individuals simply wanting to share experiences with their social media followers, to live coverage of breaking news, emergencies, or natural disasters. The latter coverage is known as mobile journalism, or "mo jo", and is becoming increasingly common. With this type of coverage, news reporters can use networked, portable electronic devices to provide mobile journalism content to a plurality of social media followers. Such reporters can be quickly and inexpensively deployed as the need or desire arises.

Several live streaming social media apps and platforms can be used for transmitting video. One such video social media app is Meerkat™ which can link with a user's Twitter™ account. Meerkat™ enables a user to stream video using a handheld, networked electronic device coupled to video capabilities. Viewers of the live stream can comment on the stream using tweets that can be seen and responded to by the broadcaster. Another popular app is Periscope™ which can transmit a live recording from one user to his or her Periscope™ account and to other followers. The Periscope⌒ app can be executed on a mobile device. The user's Periscope™ followers can receive an alert whenever that user begins a video transmission. Another live-stream video platform is Twitch™ which can be used for video streaming of video gaming and broadcasts of various competitions and events.

The example 800 shows a user 810 broadcasting a video live stream and an audio live stream to one or more people as shown by a first person 850, a second person 860, and a third person 870. A portable, network-enabled, electronic device 820 can be coupled to a front-facing camera 822. The portable electronic device 820 can be a smartphone, a PDA, a tablet, a laptop computer, and so on. The camera 822 coupled to the device 820 can have a line-of-sight view 824 to the user 810 and can capture video of the user 810. The portable electronic device 820 can be coupled to a microphone (not shown). The microphone can capture voice data 828 such as speech and non-speech vocalizations. In embodiments, non-speech vocalizations can include laughter, cries, sighs, squeals, yawns, grunts, filled pauses, unfilled pauses, and so on. The captured video and audio can be sent to an analysis or recommendation engine 840 using a network link 826 to the Internet 830. The network link can be a wireless link, a wired link, and so on. The recommendation engine 840 can recommend to the user 810 an app and/or platform that can be supported by the server and can be used to provide a video live stream, an audio live stream, or both a video live stream and an audio live stream to one or more followers of the user 810. In the example 800, the user 810 has three followers: a first person 850, a second person 860, and a third person 870. Each follower has a line-of-sight view to a video screen on a portable, networked electronic device. In other embodiments, one or more followers follow the user 810 using any other networked electronic device, including a computer. In the example 800, a first person 850 has a line-of-sight view 852 to the video screen of a device 854; a second person 860 has a line-of-sight view 862 to the video screen of a device 864, and a third person 870 has a line-of-sight view 872 to the video screen of a device 874. The device 874 can also capture audio data 878 from the third person 870. The portable electronic devices 854, 864, and 874 can each be a smartphone, a PDA, a tablet, and so on. Each portable device can receive the video stream and the audio stream being broadcast by the user 810 through the Internet 830 using the app and/or platform that can be recommended by the recommendation engine 840. The device 854 can receive a video stream and the audio stream using the network link 856, the device 864 can receive a video stream and the audio stream using the network link 866, the device 874 can receive a video stream and the audio stream using the network link 876, and so on. The network link can be a wireless link, a wired link, a hybrid link, and so on. Depending on the app and/or platform that can be recommended by the recommendation engine 840, one or more followers, such as the followers shown 850, 860, and 870, can reply to, comment on, or otherwise provide feedback to the user 810 using their respective devices 854, 864, and 874.

The human face provides a powerful communications medium through its ability to exhibit a myriad of expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters can be determined, including affect valence, spontaneous reactions, facial action units, and so on. The parameters that are determined can be used to infer or predict emotional and mental states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt-in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt-in to the video data collection.

The videos captured from the various viewers who chose to opt-in can be substantially different in terms of video quality, frame rate, etc. As a result, the facial video data can be scaled, rotated, and otherwise adjusted to improve consistency. Human factors further contribute to the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occludes or obscures the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the person who is being observed. Emotion-related facial actions can be identified using the emotional facial action coding system (EM-FACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular mental and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, and specific emotions, moods, or mental states can be identified.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from differences in illumination or shadowing changes between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBP) and Local Gabor Binary Patterns (LGBP). The HoG descriptor represents the face as a distribution of intensity gradients and edge directions and is robust in its ability to translate and scale. Differing patterns, including groupings of cells of various sizes and arranged in variously sized cell blocks, can be used. For example, 4×4 cell blocks of 8×8-pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 9:
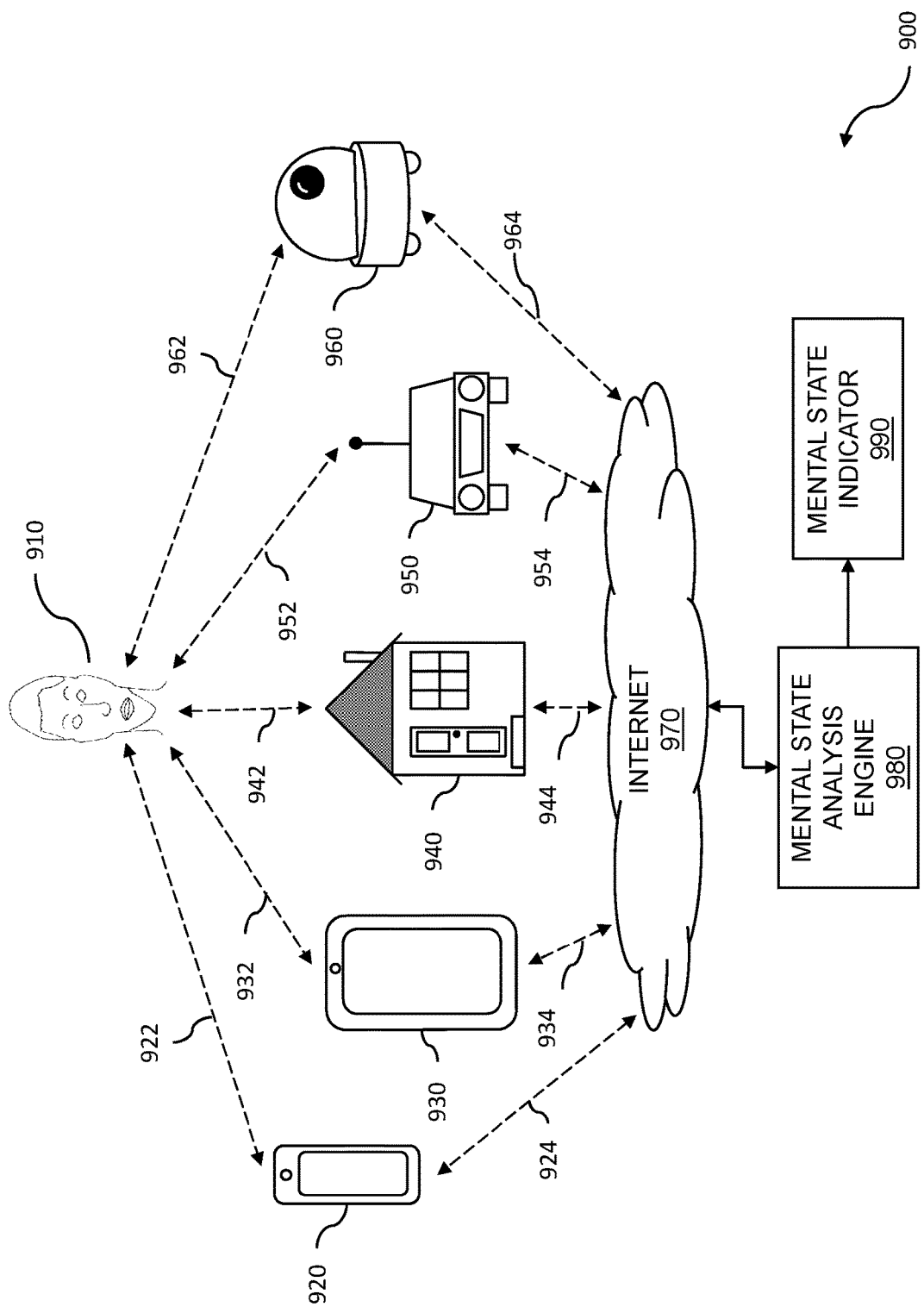
FIG. 9 shows data collection including devices and locations.

FIG. 9 shows data collection including devices and locations 900. Data including audio data and video data can be collected for image generation for avatar image animation using translation vectors. The plurality of translation vectors can be identified using a bottleneck layer within an autoencoder such as a variational autoencoder and a generative autoencoder. The multiple mobile devices, vehicles, and locations, can be used separately or in combination to collect video data on a user 910. While one person is shown, the video data can be collected on multiple people. A user 910 can be observed as she or he is performing a task, experiencing an event, viewing a media presentation, and so on. The user 910 can be shown one or more media presentations, political presentations, social media, or another form of displayed media. The one or more media presentations can be shown to a plurality of people. The media presentations can be displayed on an electronic display coupled to a client device. The data collected on the user 910 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 910 can be analyzed and viewed for a variety of purposes including expression analysis, mental state analysis, and so on. The electronic display can be on a smartphone 920 as shown, a tablet computer 930, a personal digital assistant, a television, a mobile monitor, or any other type of electronic device. In one embodiment, expression data is collected on a mobile device such as a cell phone 920, a tablet computer 930, a laptop computer, or a watch. Thus, the multiple sources can include at least one mobile device, such as a phone 920 or a tablet 930, or a wearable device such as a watch or glasses (not shown). A mobile device can include a front-facing camera and/or a rear-facing camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 910, data can be collected in a house 940 using a web camera or the like; in a vehicle 950 using a web camera, client device, etc.; by a social robot 960, and so on.

As the user 910 is monitored, the user 910 might move due to the nature of the task, boredom, discomfort, distractions, or for another reason. As the user moves, the camera with a view of the user's face can be changed. Thus, as an example, if the user 910 is looking in a first direction, the line of sight 922 from the smartphone 920 is able to observe the user's face, but if the user is looking in a second direction, the line of sight 932 from the tablet 930 is able to observe the user's face. Furthermore, in other embodiments, if the user is looking in a third direction, the line of sight 942 from a camera in the house 940 is able to observe the user's face, and if the user is looking in a fourth direction, the line of sight 952 from the camera in the vehicle 950 is able to observe the user's face. If the user is looking in a fifth direction, the line of sight 962 from the social robot 960 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 910 can also use a wearable device including a camera for gathering contextual information and/or collecting expression data on other users. Because the user 910 can move her or his head, the facial data can be collected intermittently when she or he is looking in a direction of a camera. In some cases, multiple people can be included in the view from one or more cameras, and some embodiments include filtering out faces of one or more other people to determine whether the user 910 is looking toward a camera. All or some of the expression data can be continuously or sporadically available from the various devices and other devices.

The captured video data can include facial expressions and can be transferred over the Internet 970. The smartphone 920 can share video using a link 924, the tablet 930 using a link 934, the house 940 using a link 944, the vehicle 950 using a link 954, and the social robot 960 using a link 964. The links 924, 934, 944, 954, and 964 can be wired, wireless, and hybrid links. The captured video data, including facial expressions, can be analyzed on a mental state analysis engine 980, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capture device. The analysis data from the mental state analysis engine can be processed by a mental state indicator 990. The mental state indicator 990 can indicate mental states, moods, emotions, etc. In embodiments, the emotions can include of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, sadness, poignancy, or mirth.

Figure 10:
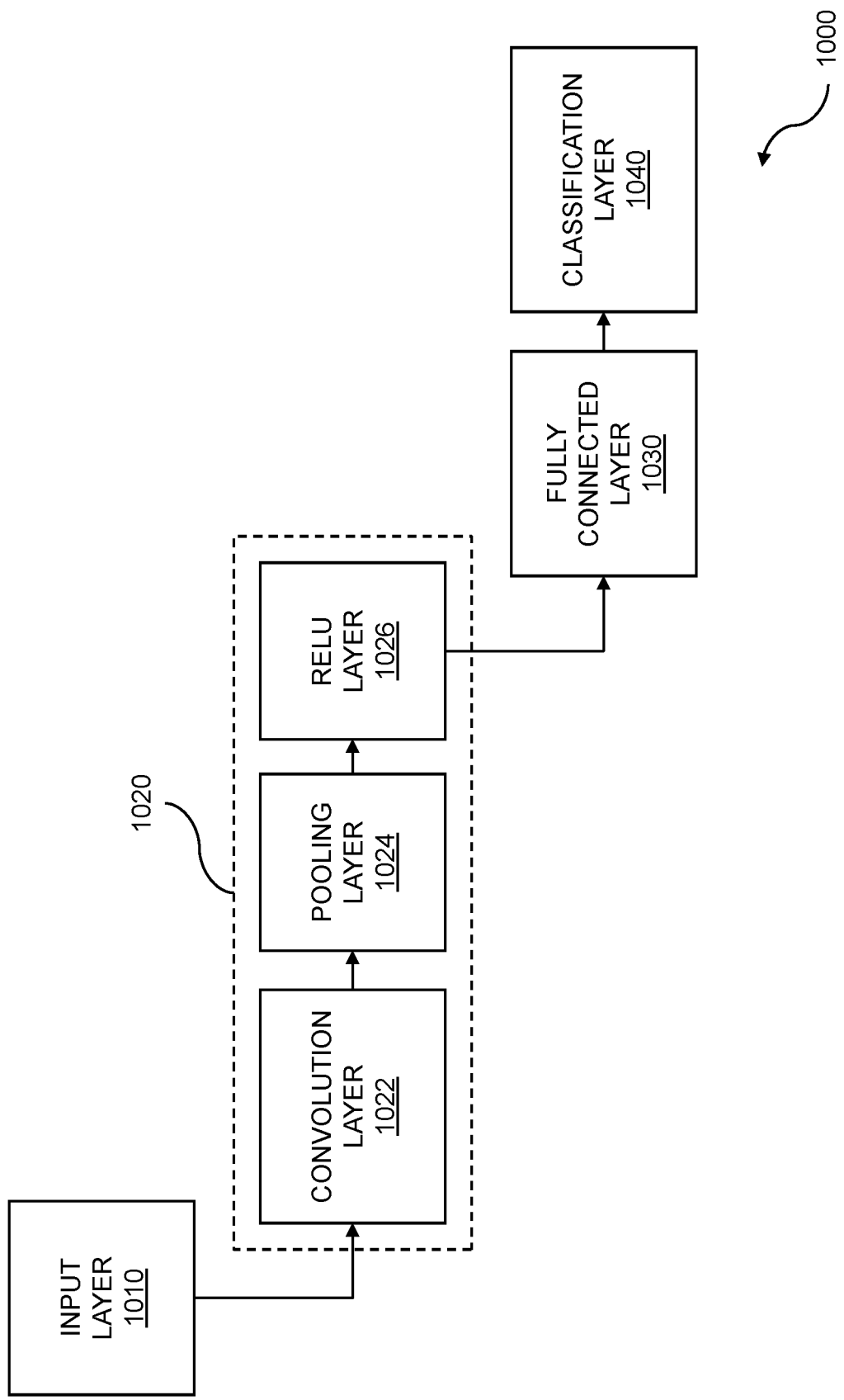
FIG. 10 is an example showing a convolutional neural network.

FIG. 10 is an example showing a convolutional neural network (CNN). The convolutional neural network can be used for deep learning, where the deep learning can be applied to avatar image animation using translation vectors. The plurality of translation vectors can be identified using a bottleneck layer within an autoencoder. The convolutional neural network can be applied to such tasks as mental state analysis, mood analysis, emotional state analysis, and so on. Emotion analysis is a very complex task. Understanding and evaluating moods, emotions, or mental states requires a nuanced evaluation of facial expressions or other cues generated by people. Mental state analysis is important in many areas such as research, psychology, business, intelligence, law enforcement, and so on. The understanding of mental states can be useful for a variety of business purposes, such as improving marketing analysis, assessing the effectiveness of customer service interactions and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the mental state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general mental state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be collected, where the physiological data can be obtained using a camera or other image capture device, without contacting the person or persons. Respiration, heart rate, heart rate variability, perspiration, temperature, and other physiological indicators of mental state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more moods, mental states, emotional states, etc.

The artificial neural network, such as a convolutional neural network, which forms the basis for deep learning, is based on layers. The layers can include an input layer, a convolution layer, a fully connected layer, a classification layer, and so on. The input layer can receive input data such as image data, where the image data can include a variety of formats including pixel formats. The input layer can then perform processing such as identifying boundaries of the face, identifying landmarks of the face, extracting features of the face, and/or rotating a face within the plurality of images. The convolution layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of mental state. The last layer of the convolutional neural network can be the final classification layer. The output of the final classification layer can be indicative of the mental states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 10 is an example showing a convolutional neural network 1000. The convolutional neural network can be used for deep learning, where the deep learning can be applied to avatar image animation using translation vectors. The deep learning system can be accomplished using a convolution neural network or other techniques. The deep learning can accomplish facial recognition and analysis tasks. The network includes an input layer 1010. The input layer 1010 receives image data. The image data can be input in a variety of formats, such as JPEG, TIFF, BMP, and GIF. Compressed image formats can be decompressed into arrays of pixels, wherein each pixel can include an RGB tuple. The input layer 1010 can then perform processing such as identifying boundaries of the face, identifying landmarks of the face, extracting features of the face, and/or rotating a face within the plurality of images.

The network includes a collection of intermediate layers 1020. The multilayered analysis engine can include a convolutional neural network. Thus, the intermediate layers can include a convolution layer 1022. The convolution layer 1022 can include multiple sublayers, including hidden layers within it. The output of the convolution layer 1022 feeds into a pooling layer 1024. The pooling layer 1024 performs a data reduction, which makes the overall computation more efficient. Thus, the pooling layer reduces the spatial size of the image representation to reduce the number of parameters and computation in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 1024. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 1026. The output of the pooling layer 1024 can be input to the RELU layer 1026. In embodiments, the RELU layer implements an activation function such as $f(x)=\max(0,x)$, thus providing an activation with a threshold at zero. In some embodiments, the RELU layer 1026 is a leaky RELU layer. In this case, instead of the activation function providing zero when x<0, a small negative slope is used, resulting in an activation function such as $f(x)=1(x<0)(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can include multiple layers that include one or more convolutional layers 1022 and one or more hidden layers, and wherein the multilayered analysis engine can be used for emotional analysis.

The example 1000 includes a fully connected layer 1030. The fully connected layer 1030 processes each pixel/data point from the output of the collection of intermediate layers 1020. The fully connected layer 1030 takes all neurons in the previous layer and connects them to every single neuron it has. The output of the fully connected layer 1030 provides input to a classification layer 1040. The output of the classification layer 1040 provides a facial expression and/or mental state as its output. Thus, a multilayered analysis engine such as the one depicted in FIG. 10 processes image data using weights, models the way the human visual cortex performs object recognition and learning, and effectively analyzes image data to infer facial expressions and mental states.

Figure 11:
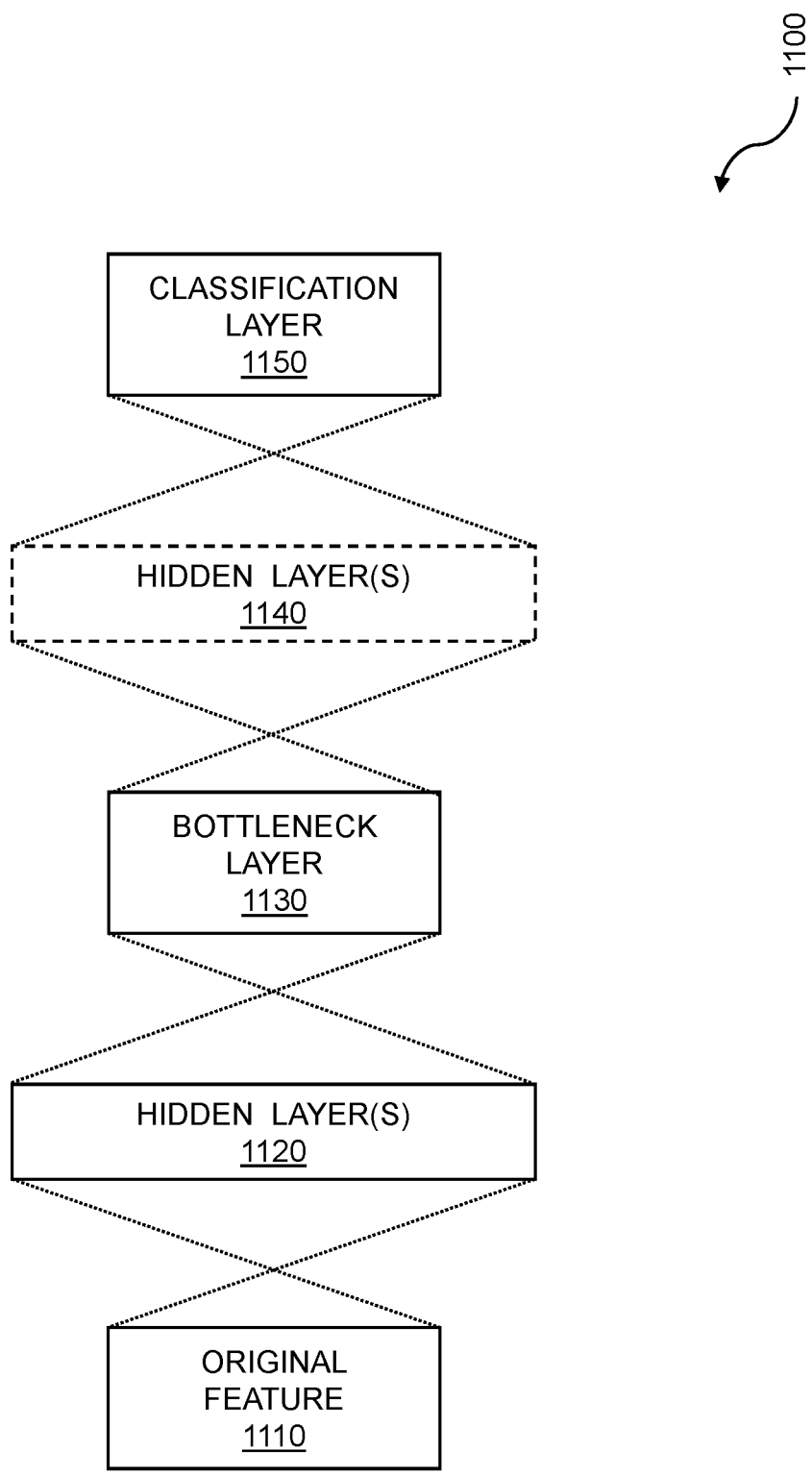
FIG. 11 shows a bottleneck layer.

FIG. 11 shows a bottleneck layer within a deep learning environment. A bottleneck layer can be a layer of a deep neural network and can be used for avatar image animation using translation vectors. The plurality of translation vectors can be identified using a bottleneck layer within an autoencoder such as a variational autoencoder and a generative autoencoder. Layers of a deep neural network can include a bottleneck layer 1100. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1110. A feature such as an image feature can include points, edges, objects, boundaries between and among regions, properties, and so on. The deep neural network can include one or more hidden layers 1120. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer can determine how the transformation occurs. A single bottleneck layer can be trained to transform a neutral face or voice to a different emotional face or voice. In some cases, an individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1130. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 1140. The count of the hidden layers can include zero hidden layers, one hidden layer, a plurality of hidden layers, and so on. The hidden layers following the bottleneck layer can include more nodes than the bottleneck layer. The deep neural network can include a classification layer 1150. The classification layer can be used to identify the points, edges, objects, boundaries, and so on, described above. The classification layer can be used to identify mental states, emotional states, moods, and the like. The output of the final classification layer can be indicative of the emotional states of faces within the images, where the images can be processed using the deep neural network.

Figure 12:
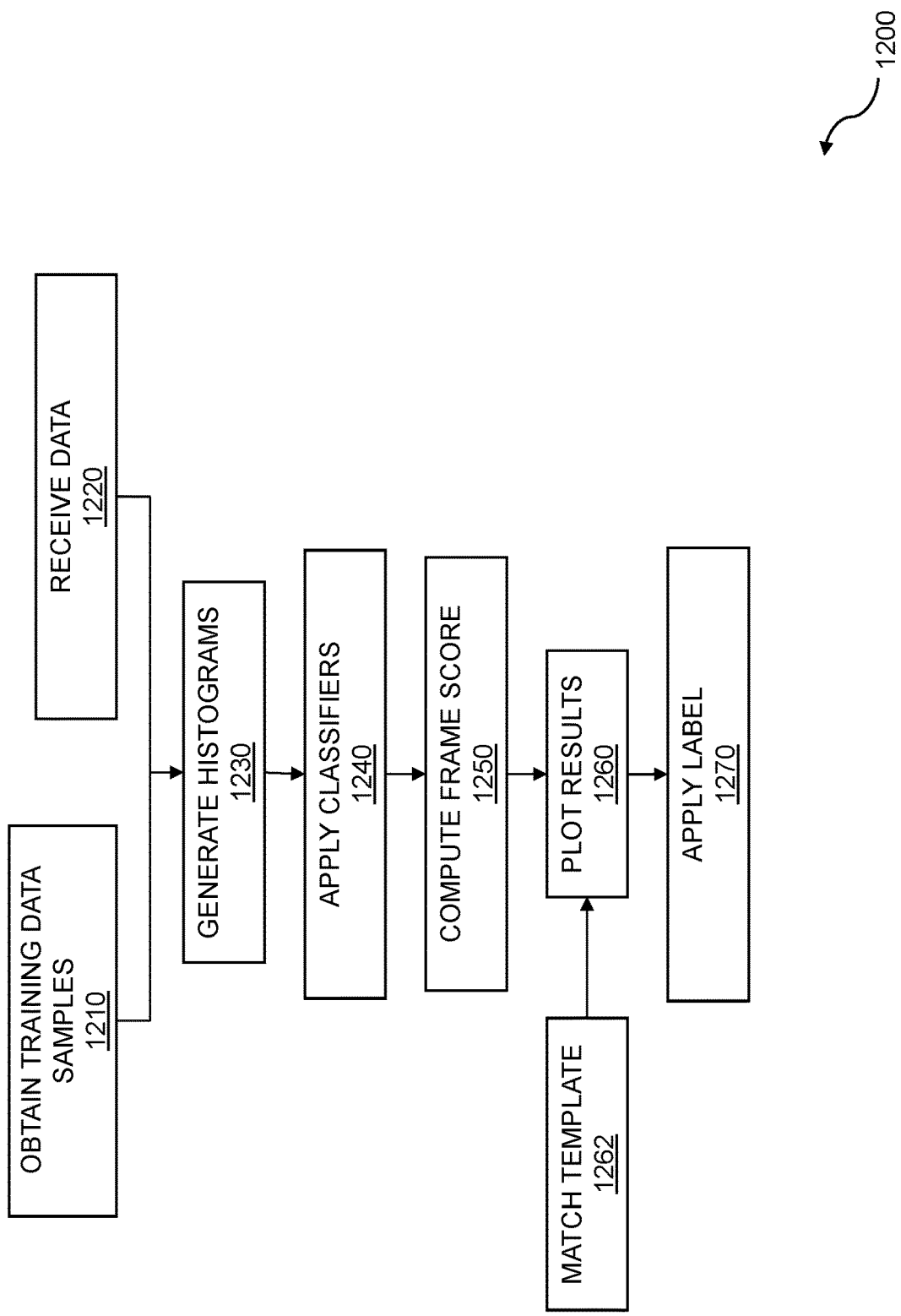
FIG. 12 is a flow diagram for detecting expressions.

FIG. 12 is a flow diagram for detecting expressions. Detecting expressions can be performed for avatar image animation using translation vectors. The plurality of translation vectors can be identified using a bottleneck layer within an autoencoder. The flow 1200, or portions thereof, can be implemented in semiconductor logic, can be accomplished using a mobile device, can be accomplished using a server device, and so on. The flow 1200 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on determination of action units (AU), where the action units are determined using FACS coding. The AUs can be used separately or in combination to identify facial expressions. Based on the facial landmarks, one or more AUs can be identified by number and intensity. For example, AU12 can be used to code a lip corner puller which can further be used to infer a smirk.

The flow 1200 begins by obtaining training image samples 1210. The image samples can include a plurality of images of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera, a sensor, and so on. The flow 1200 continues with receiving an image 1220. The image 1220 can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 1200 continues with generating histograms 1230 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 1200 continues with applying classifiers 1240 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 1200 continues with computing a frame score 1250. The score computed for an image, where the image can be a frame from a video, can be used to determine the presence of a facial expression in the image or video frame. The score can be based on one or more versions of the image or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier that is used can identify symmetrical facial expressions (e.g. smile), asymmetrical facial expressions (e.g. outer brow raiser), and so on.

The flow 1200 continues with plotting results 1260. The results that are plotted can include one or more scores for one or more frames computed over a given time t. For example, the plotted results can include classifier probability results from analysis of HoGs for a sequence of images and video frames. The plotted results can be matched with a template 1262. The template can be temporal and can be represented by a centered box function or another function. A best fit with one or more templates can be found by computing a minimum error. Other best-fit techniques can include polynomial curve fitting, geometric curve fitting, and so on. The flow 1200 continues with applying a label 1270. The label can be used to indicate that a particular facial expression has been detected in the one or more images or video frames which constitute the image that was received 1220. The label can be used to indicate that any of a range of facial expressions has been detected, including a smile, an asymmetric smile, a frown, and so on. Various steps in the flow 1200 may be changed in order, repeated, omitted, or the like without departing from the disclosed concepts. Various embodiments of the flow 1200 can be included in a computer program product embodied in a non-transitory computer readable medium that includes code executable by one or more processors. Various embodiments of the flow 1200, or portions thereof, can be included on a semiconductor chip and implemented in special purpose logic, programmable logic, and so on.

Figure 13:
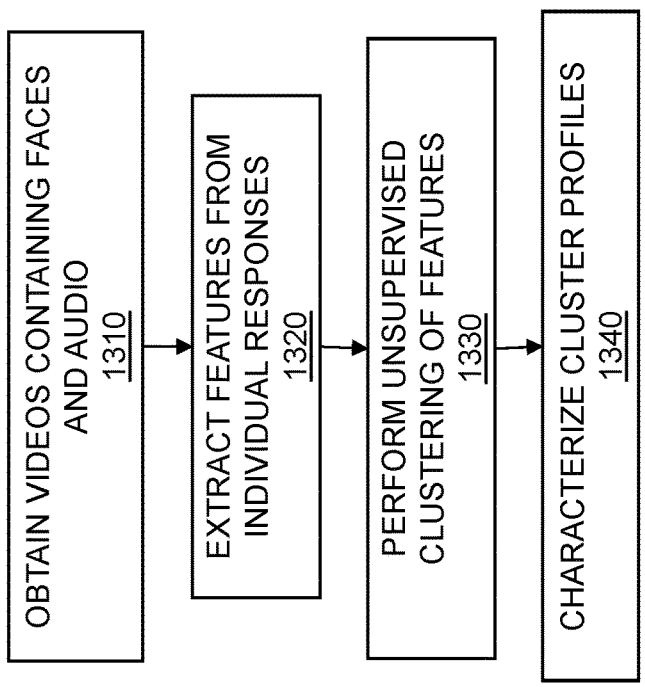
FIG. 13 is a flow diagram for the large-scale clustering of events.

FIG. 13 is a flow diagram for the large-scale clustering of events. The large-scale clustering of events can be performed for avatar image animation using translation vectors. The plurality of translation vectors can be identified using a bottleneck layer within an autoencoder such as a variational autoencoder and a generative autoencoder. The large-scale clustering of facial events can be performed for data collected from a remote computing device. The facial events can be collected from people as they interact with the Internet. The clustering and evaluation of facial events can be augmented using a mobile device, a server, semiconductor-based logic, and so on. As discussed above, collection of facial video data from one or more people can include a web-based framework. The web-based framework can be used to collect facial video data from large numbers of people located over a wide geographic area. The web-based framework can include an opt-in feature that allows people to agree to facial data collection. The web-based framework can be used to render and display data to one or more people and can collect data from the one or more people. For example, the facial data collection can be based on showing one or more viewers a video media presentation through a website. The web-based framework can be used to display the video media presentation or event and to collect videos from multiple viewers who are online. That is, the collection of videos can be crowdsourced from those viewers who elected to opt-in to the video data collection. The video event can be a commercial, a political ad, an educational segment, and so on.

The flow 1300 includes obtaining videos containing faces and audio 1310. The videos can be obtained using one or more cameras, where the cameras can include a webcam coupled to one or more devices employed by the one or more people using the web-based framework. The flow 1300 continues with extracting features from the individual responses 1320. The individual responses can include videos containing faces observed by the one or more webcams. The features that are extracted can include facial features such as an eyebrow, a nostril, an eye edge, a mouth edge, and so on. The feature extraction can be based on facial coding classifiers, where the facial coding classifiers output a probability that a specified facial action has been detected in a given video frame. The flow 1300 continues with performing unsupervised clustering of features 1330. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories.

The flow 1300 includes characterizing cluster profiles 1340. The profiles can include a variety of facial expressions such as smiles, asymmetric smiles, eyebrow raisers, eyebrow lowerers, etc. The profiles can be related to a given event. For example, a humorous video can be displayed in the web-based framework and the video data of people who have opted-in can be collected. The characterization of the collected and analyzed video can depend in part on the number of smiles that occurred at various points throughout the humorous video. Similarly, the characterization can be performed on collected and analyzed videos of people viewing a news presentation. The characterized cluster profiles can be further analyzed based on demographic data. The number of smiles resulting from people viewing a humorous video can be compared to various demographic groups, where the groups can be formed based on geographic location, age, ethnicity, gender, and so on.

The flow 1300 can include determining mental state event temporal signatures. The mental state event temporal signatures can include information on rise time to facial expression intensity, fall time from facial expression intensity, duration of a facial expression, and so on. In some embodiments, the mental state event temporal signatures are associated with certain demographics, ethnicities, cultures, etc. The mental state event temporal signatures can be used to identify one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. Various steps in the flow 1300 may be changed in order, repeated, omitted, or the like without departing from the disclosed concepts. Various embodiments of the flow 1300 can be included in a computer program product embodied in a non-transitory computer readable medium that includes code executable by one or more processors. Various embodiments of the flow 1300, or portions thereof, can be included on a semiconductor chip and implemented in special purpose logic, programmable logic, and so on.

Figure 14:
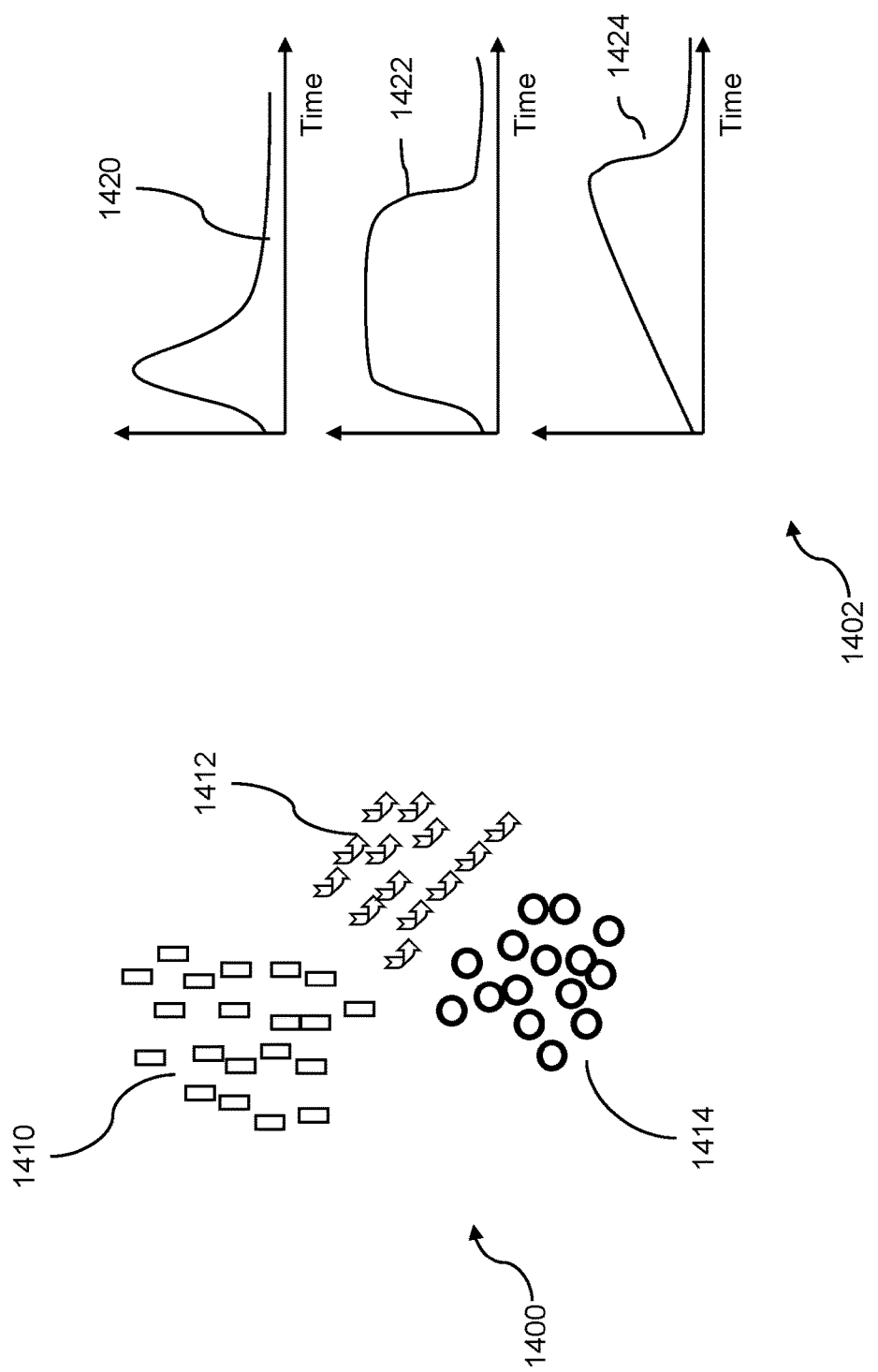
FIG. 14 is an example illustrating unsupervised clustering of features and characterizations of cluster profiles.

FIG. 14 is an example illustrating unsupervised clustering of features and characterizations of cluster profiles. The clustering of features and characterizations of cluster profiles can be performed for avatar image animation using translation vectors. The plurality of translation vectors can be identified using a bottleneck layer within an autoencoder. The example 1400 shows three clusters, 1410, 1412, and 1414. The clusters can be based on video collected from people who have opted-in to video collection. When the data collected is captured using a web-based framework, the data collection can be extensive, including hundreds, thousands, or even more participants who can be situated locally and/or across a wide geographic area. Unsupervised clustering is a technique that can be used to process the large amounts of captured facial data and to identify groupings of similar observations. The unsupervised clustering can also be used to characterize the groups of similar observations. The characterizations can include identifying behaviors of the participants. The characterizations can be based on identifying facial expressions and facial action units of the participants. Some behaviors and facial expressions can include faster or slower onsets, faster or slower offsets, longer or shorter durations, etc. The onsets, offsets, and durations can all correlate to time. The data clustering that results from the unsupervised clustering can support data labeling. The labeling can include FACS coding. The clusters can be partially or totally based on a facial expression resulting from participants viewing a video presentation, where the video presentation can be an advertisement, a political message, educational material, a public service announcement, and so on. The clusters can be correlated with demographic information, where the demographic information can include educational level, geographic location, age, gender, income level, and so on.

The cluster profiles 1402 can be generated based on the clusters that can be formed from unsupervised clustering, with time shown on the x-axis and intensity or frequency shown on the y-axis. The cluster profiles can be based on captured facial data, including facial expressions. The cluster profile 1420 can be based on the cluster 1410, the cluster profile 1422 can be based on the cluster 1412, and the cluster profile 1424 can be based on the cluster 1414. The cluster profiles 1420, 1422, and 1424 can be based on smiles, smirks, frowns, or any other facial expression. The emotional states of the people who have opted-in to video collection can be inferred by analyzing the clustered facial expression data. The cluster profiles can be plotted with respect to time and can show a rate of onset, a duration, and an offset (rate of decay). Other time-related factors can be included in the cluster profiles. The cluster profiles can be correlated with demographic information, as described above.

Figure 15:
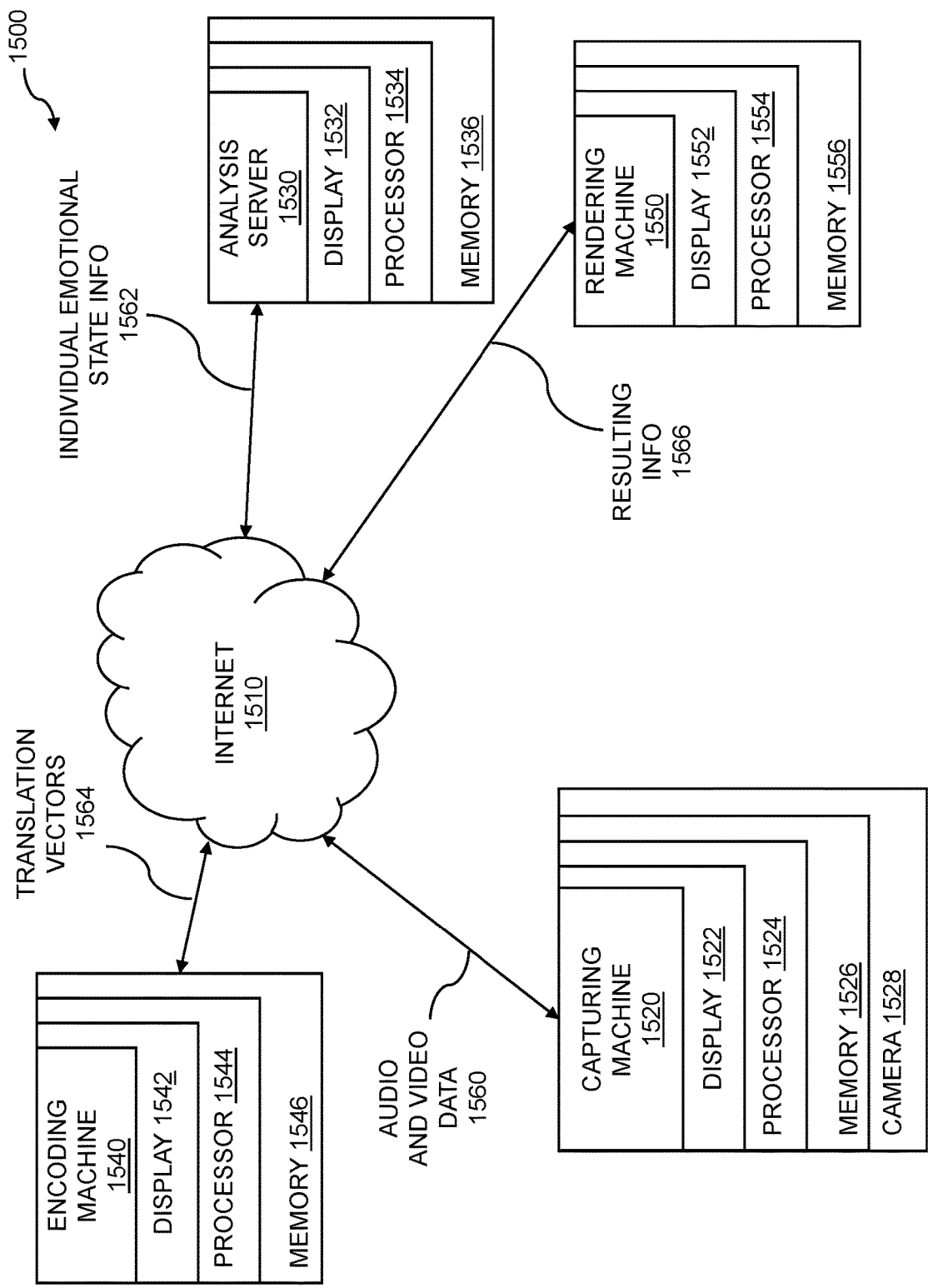
FIG. 15 is a diagram of a system for an emotion enabled avatar for animating emotions.

FIG. 15 is a diagram of a system for an emotion-enabled avatar for animating emotions. The emotion-enabled avatar can be an animation, where the animation uses translation vectors. An avatar image is obtained for representation on a first computing device. An autoencoder is trained, on a second computing device comprising an artificial neural network, to generate synthetic emotive faces. A plurality of translation vectors is identified corresponding to a plurality of emotion metrics, based on the training. A subset of the plurality of translation vectors is applied to the avatar image, wherein the subset represents an emotion metric input. An animated avatar image is generated for the first computing device, based on the applying, wherein the animated avatar image is reflective of the emotion metric input.

The Internet 1510, intranet, or another wired, wireless, or hybrid computer network can be used for communication among the various machines that comprise a system for image analysis. A capturing machine 1520 has a memory 1526 which stores instructions and one or more processors 1524 attached to the memory 1526, wherein the one or more processors 1524 can execute instructions. The capturing machine 1520 can also have an internet connection to carry mental state audio and video data 1560, and a display 1522 that can present various renderings to a user. The capturing machine 1520 can collect audio data, video data, and mental state data from a plurality of people as they interact with a rendering or are engaged in an activity such as a social activity. The capturing machine 1520 can include a camera 1528. The camera 1528 can include a webcam, a video camera, a still camera, a thermal imager, a CCD device, a phone camera, a three-dimensional camera, a depth camera, a light field camera, multiple webcams used to show different views of a person, or any other type of image capture technique that can allow captured data to be used in an electronic system. In some embodiments, there are multiple capturing machines 1520 that each collect mental state data including audio data and video data from one person or a plurality of people as they interact with a rendering or are engaged in a social activity. The capturing machine 1520 can communicate with an analysis server 1530 and other machines over the internet 1510, some other computer network, or by another method suitable for communication between and among computers. In some embodiments, the analysis server 1530 functionality is embodied in the capturing machine 1520.

An encoding machine 1540 can have an internet connection for translation vectors 1564, which can include other data, a memory 1546 which stores instructions, and one or more processors 1544 attached to the memory 1546, wherein the one or more processors 1544 can execute instructions. The encoding machine 1540 can include a variational autoencoder, a generative autoencoder, and so on. The variational autoencoder, generative autoencoder, etc., can identify translation vectors. In embodiments, the identifying the plurality of translation vectors can use a bottleneck layer within the autoencoder. The translation vectors can be determined for one or more individuals interacting with one or more capturing machines 1520. In some embodiments, the encoding machine 1540 renders content on a display 1542. The display 1542 can be any electronic display, including but not limited to, a computer display, a laptop screen, a net-book screen, a tablet computer screen, a smartphone display, a mobile device display, a remote with a display, a television, a projector, or the like.

An analysis server 1530 can have an internet connection for individual emotional state information 1562, a memory 1536 which stores instructions, and one or more processors 1534 attached to the memory 1536, wherein the one or more processors 1534 can execute instructions. The analysis server 1530 can receive individual emotional state information 1562 collected from one or more people as they interact with a rendering, social activity, etc., on a capturing machine 1520 and can analyze, encode, etc., the emotional state information on the plurality of people who interact with a rendering, social activity, etc. In some embodiments, the analysis server 1530 also allows a user to view and evaluate on a display 1532 the individual emotional state information that is associated with the rendering, social activity, and the like.

A rendering machine 1550 can have a memory 1556 which stores instructions, and one or more processors 1554 attached to the memory 1556, wherein the one or more processors 1554 can execute instructions. The rendering machine 1550 can use a connection to the Internet 1510, or another computer communication technique, to send and receive resulting information 1566. The rendering machine 1550 can receive mental state information, audio data and video data 1560, including facial information, translation vectors 1564, individual emotional state information 1562, etc. The data and information can be rendered on a display 1552.

In other embodiments, the system 1500 can include a computer program product embodied in a non-transitory computer readable medium for image generation, the computer program product comprising code which causes one or more processors to perform operations of: obtaining an avatar image for representation on a first computing device; training an autoencoder on a second computing device comprising an artificial neural network, to generate synthetic emotive faces; identifying a plurality of translation vectors corresponding to a plurality of emotion metrics, based on the training; applying a subset of the plurality of translation vectors to the avatar image, wherein the subset represents an emotion metric input; and generating an animated avatar image for the first computing device, based on the applying, wherein the animated avatar image is reflective of the emotion metric input.

Each of the above methods may be executed on one or more processors on one or more computer systems. Embodiments may include various forms of distributed computing, client/server computing, and cloud based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, and so on. Any and all of these may be generally referred to herein as a "circuit," "module," or "system."

A programmable apparatus which executes any of the above-mentioned computer program products or computer implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random-access memory (RAM), a read-only memory (ROM), an erasable programmable read-only memory (EPROM, Flash, MRAM, FeRAM, or phase change memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more threads. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer-implemented method for image generation comprising:
    obtaining an avatar image for representation on a first computing device;
    training an autoencoder, on a second computing device comprising an artificial neural network, to generate synthetic emotive faces;
    identifying, using a bottleneck layer within the autoencoder, a plurality of translation vectors corresponding to a plurality of emotion metrics, based on the training;
    generating a first set of bottleneck layer parameters, from the bottleneck layer, learned for a neutral face;
    applying a subset of the plurality of translation vectors to the avatar image, wherein the subset represents an emotion metric input; and
    generating an animated avatar image for the first computing device, based on the applying, wherein the animated avatar image is reflective of the emotion metric input.

2. The method of claim 1 wherein the emotion metric input is obtained from facial analysis of an individual.

3. The method of claim 2 wherein the animated avatar image represents a facial expression of the individual.

4. The method of claim 3 wherein the facial expression is identified using a software development kit.

5. The method of claim 2 wherein the animated avatar image represents an empathetic mirroring of the individual.

6. The method of claim 5 wherein the empathetic mirroring causes the animated avatar image to have a similar expression to the individual.

7. The method of claim 5 wherein the empathetic mirroring causes the animated avatar image to have a complementary expression to the individual.

8. The method of claim 1 wherein the training is based on reinforced learning.

9. The method of claim 1 wherein the autoencoder is a variational autoencoder.

10. The method of claim 1 wherein the autoencoder is a generative autoencoder.

11. The method of claim 1 wherein the training is based on a plurality of facial videos of pre-catalogued facial emotion expressions.

12. The method of claim 1 further comprising generating a second set of bottleneck layer parameters for an emotional face.

13. The method of claim 12 further comprising subtracting the first set of bottleneck layer parameters from the second set of bottleneck layer parameters for use in the plurality of translation vectors.

14. The method of claim 1 wherein the avatar image includes vocalizations.

15. The method of claim 1 wherein the generating further comprises vocalizations based on the emotion metric input.

16. The method of claim 15 wherein the vocalizations include non-speech vocalizations.

17. The method of claim 15 wherein the vocalizations are based on preprocessing a voice used with the animated avatar image.

18. The method of claim 1 wherein the avatar image includes vocal mirroring.

19. The method of claim 1 wherein the avatar image includes complementary emotions.

20. The method of claim 1 wherein the avatar image includes empathetic mirroring.

21. The method of claim 1 further comprising altering a self-avatar image of a person based on facial analysis of images of the person obtained after the self-avatar image was generated.

22. A computer program product embodied in a non-transitory computer readable medium for image generation, the computer program product comprising code which causes one or more processors to perform operations of:
    obtaining an avatar image for representation on a first computing device;
    training an autoencoder, on a second computing device comprising an artificial neural network, to generate synthetic emotive faces;
    identifying, using a bottleneck layer within the autoencoder, a plurality of translation vectors corresponding to a plurality of emotion metrics, based on the training;
    generating a first set of bottleneck layer parameters, from the bottleneck layer, learned for a neutral face;
    applying a subset of the plurality of translation vectors to the avatar image, wherein the subset represents an emotion metric input; and
    generating an animated avatar image for the first computing device, based on the applying, wherein the animated avatar image is reflective of the emotion metric input.

23. A computer system for image generation comprising:
    a memory which stores instructions;
    one or more processors attached to the memory wherein the one or more processors, when executing the instructions which are stored, are configured to:
        obtain an avatar image for representation on a first computing device;
        train an autoencoder, on a second computing device comprising an artificial neural network, to generate synthetic emotive faces;
        identify, using a bottleneck layer within the autoencoder, a plurality of translation vectors corresponding to a plurality of emotion metrics, based on the training;
        generate a first set of bottleneck layer parameters, from the bottleneck layer, learned for a neutral face;
        apply a subset of the plurality of translation vectors to the avatar image, wherein the subset represents an emotion metric input; and
        generate an animated avatar image for the first computing device, based on the applying, wherein the animated avatar image is reflective of the emotion metric input.

* * * * *